(12) United States Patent
Shimada

(10) Patent No.: US 6,473,121 B1
(45) Date of Patent: Oct. 29, 2002

(54) IMAGE PICKUP APPARATUS WITH OPTICAL ELEMENT MOVABLE AMONG A PLURALITY OF INCLINATION POSITIONS

(75) Inventor: Koichi Shimada, Yokoze-machi (JP)

(73) Assignee: Canon Denshi Kabushiki Kaisha, Saitama-ken (JP)

( * ) Notice: Subject to any disclaimer, the term of this patent is extended or adjusted under 35 U.S.C. 154(b) by 0 days.

(21) Appl. No.: 09/054,996

(22) Filed: Apr. 3, 1998

(30) Foreign Application Priority Data

Apr. 7, 1997 (JP) ............................................. 9-088235

(51) Int. Cl.⁷ .............................................. H04N 5/225
(52) U.S. Cl. ....................................... 348/219; 348/335
(58) Field of Search ................................. 348/207, 208, 348/219, 335; 396/52–55; 382/54; H04N 5/225

(56) References Cited

U.S. PATENT DOCUMENTS 5,920,342 A * 7/1999 Umeda et al. ............... 348/211
6,091,448 A * 7/2000 Washisu et al. ............. 348/208
6,233,009 B1 * 5/2001 Morofuji et al. ............ 348/208

FOREIGN PATENT DOCUMENTS

| EP | 0483530 | 5/1992 |
| EP | 0689349 | 12/1995 |
| GB | 2111716 | 7/1983 |

OTHER PUBLICATIONS

Patent Abstracts of Japan No. JP 09 083877 A, published Mar. 28, 1997, vol. 097, No. 007.
Patent Abstracts of Japan No. JP 60 185923 A, published Sep. 21, 1985, vol. 010, No. 038.

* cited by examiner

Primary Examiner—Tuan Ho
(74) Attorney, Agent, or Firm—Robin, BLecker & Daley

(57) ABSTRACT

An image pickup apparatus includes an image pickup element for photoelectrically converting an optical image formed on an image pickup surface and outputting a picked-up image signal, a parallel-plane plate for shifting an incident position of incident light on the image pickup surface, a plurality of recess portions which function as a plurality of restricting portions for controlling an inclination position of the parallel-plane plate by respectively coming into abutment with permanent magnets secured to the opposite ends of the parallel-plane plate and restricting the positions of the opposite ends in the direction of an optical axis, and a plurality of electromagnets for driving the parallel-plane plate to bring the parallel-plane plate into abutment with the plurality of recess portions, wherein the energization and deenergization of each of the electromagnets are controlled so that the parallel-plane plate is controlled to move among a plurality of inclination positions.

12 Claims, 19 Drawing Sheets

A-A' CROSS SECTIONAL VIEW

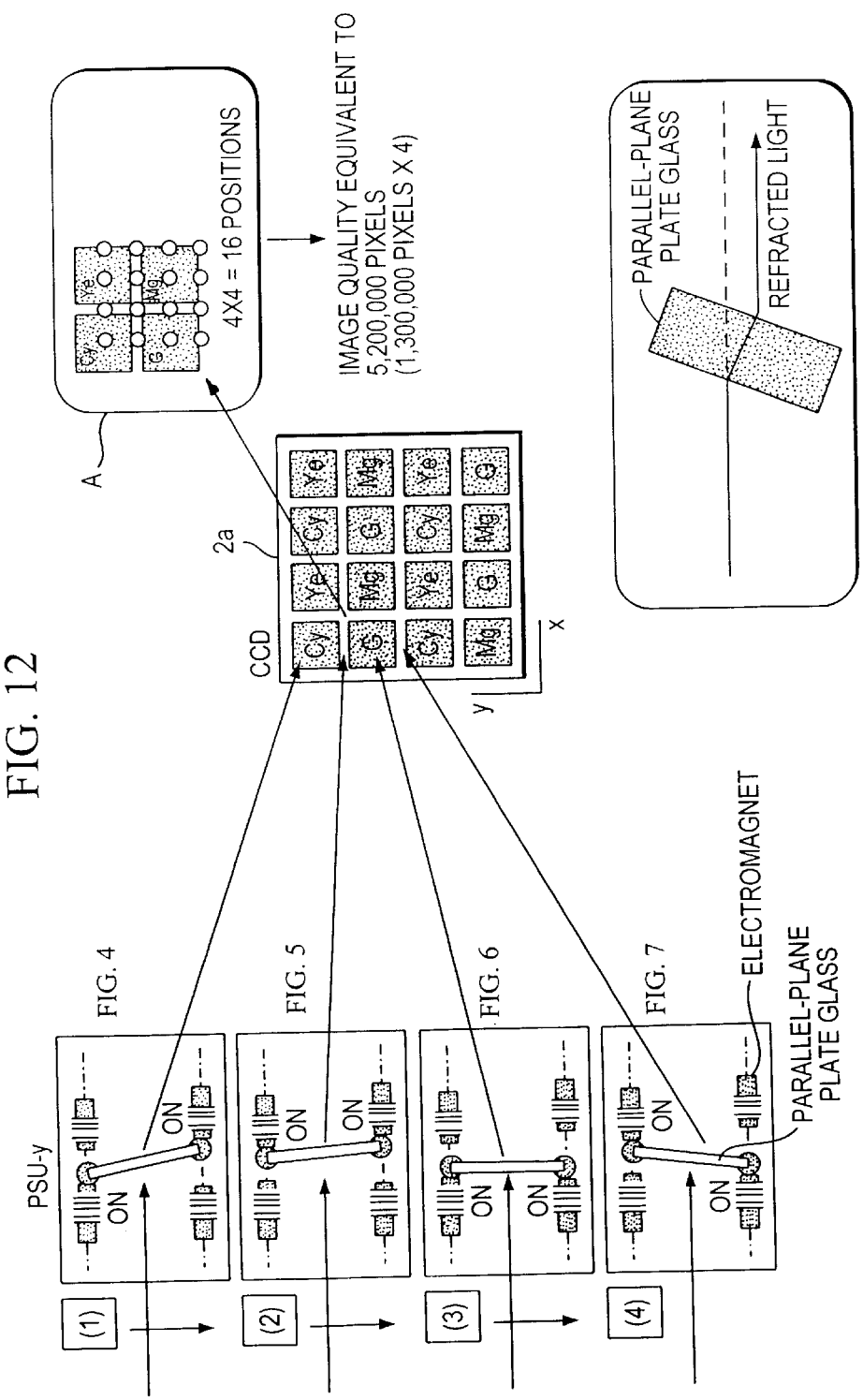

IMAGE PICKUP APPARATUS WITH OPTICAL ELEMENT MOVABLE AMONG A PLURALITY OF INCLINATION POSITIONS

BACKGROUND OF THE INVENTION

1. Field of the Invention

The present invention relates to an image pickup apparatus capable of inputting an image of substantially high image quality by finely varying the optical angle of a parallel-plane plate glass or a reflecting mirror which is provided in the optical path of an image pickup system.

2. Description of Related Art

In recent years, image input apparatuses such as video cameras and scanners have made remarkable advances, and far higher image quality and far higher resolution have been strongly demanded. However, to increase the number of pixels per image pickup element involves a number of problems, such as performance problems such as a lowering in sensitivity or S/N, an increase in cost due to a decrease in production yield, and the necessity for an expensive quartz-crystal low-pass filter or the like for preventing a false signal or the like.

What is called "pixel shifting" is known as a method of increasing the image quality and the resolution of an image pickup apparatus without increasing the number of pixels per image pickup element. The pixel shifting is a method of finely vibrating an image pickup element itself or sequentially obtaining optical-video information by conducting, to photosensitive portions on the image pickup element, optical-image information which would have reached non-photosensitive portions between adjacent photosensitive portions, while varying the reflection angle of a reflecting mirror disposed in an optical path in an optical relay space between a lens unit and the image pickup element or while varying the incident angle of light on an optical transmission glass having the shape of a parallel-plane plate or varying the thickness of the optical transmission glass by using the refraction of light by the optical transmission glass which is disposed in such optical path. According to such pixel shifting, it is possible to obtain an image having a high resolution which is substantially equivalent to a resolution obtainable when the number of pixels of an image pickup element is increased.

Since this method makes it possible to pick up an image of high image quality without increasing the number of pixels of the image pickup element itself, the pixel shifting is a method which is extremely effective in increasing the resolution of the image input apparatus.

Specific examples of pixel shifting using the above-described principles have been disclosed. For example, Japanese Laid-Open Patent Application No. Sho 59-15378 discloses the art of rotating a parallel-plane plate about an axis parallel to a pixel array, Japanese Laid-Open Patent Application No. Hei 1-121816 discloses the art of inclining a parallel-plane plate surface and rotating it about an optical axis, and Japanese Laid-Open Utility Model Application No. Hei 6-8937 discloses the art of driving a cam mechanism by means of a motor and varying the inclination of a parallel-plane plate surface in the directions of X and Y axes.

However, in any of the above-described conventional mechanism examples which use a parallel-plane plate optical-transmission glass, a motor is used as a drive source which varies the optical position of the parallel-plane plate optical-transmission glass and a complicated expensive mechanism such as a position control mechanism using a cam is used, with the result that it is difficult to ensure the positioning accuracy of the parallel-plane plate optical-transmission glass and it is also difficult to increase the driving speed thereof.

If two horizontal and vertical systems each including a motor, a cam and a mechanism for transmitting the drive force of the motor are incorporated in an image pickup apparatus, a number of problems will occur; for example, the entire pixel shifting mechanism necessarily becomes larger in size and difficult to dispose in the space between the lens unit and the image pickup element.

To cope with the above-described problems, the assignee of the present invention has filed Japanese Patent Application No. Hei 9-4476 dated Jan. 14, 1997 as an image pickup apparatus and an optical apparatus each of which includes a pixel shifting system intended to solve the problems and capable of being driven at high speed by means of a simple arrangement.

BRIEF SUMMARY OF THE INVENTION

The present invention is intended to solve the above-described problems and to realize a further increase in driving speed of the invention of Japanese Patent Application No. Hei 9-4476.

A first object of the present invention is to provide an optical apparatus and an image pickup apparatus both of which are capable of performing extremely high-speed pixel shifting.

A second object of the present invention is to provide an optical apparatus and an image pickup apparatus both of which have a small-size and high-speed pixel shifting function which is easy to control.

A third object of the present invention is to provide an optical apparatus and an image pickup apparatus both of which are capable of performing high-speed pixel shifting in either direction.

To achieve the above objects, in accordance with one aspect of the present invention, there is provided an image pickup apparatus which comprises image pickup means for photoelectrically converting an optical image formed on an image pickup surface and outputting a picked-up image signal, an optical element for shifting an incident position of incident light on the image pickup surface, a plurality of restricting portions for controlling an inclination position of the optical element with respect to an optical axis by engaging with the optical element, and driving means for driving the optical element to engage the optical element with the plurality of restricting portions, wherein the driving means includes electromagnetic driving means, and permanent magnets are respectively disposed in portions of the optical element which are to be exposed to an action of electromagnetic force of the electromagnetic driving means, the optical element being driven by an electromagnetic circuit formed by the permanent magnets of the optical element and the electromagnetic driving means.

In accordance with another aspect of the present invention, there is provided an optical apparatus which comprises an optical element for shifting an incident position of incident light on an image pickup surface, a plurality of restricting portions for controlling an inclination position of the optical element with respect to an optical axis by engaging with the optical element, and driving means for driving the optical element to engage the optical element with the plurality of restricting portions, wherein the driving means includes electromagnetic driving means, and permanent magnets are respectively disposed in portions of the optical element which are to be exposed to an action of electromagnetic force of the electromagnetic driving means, the optical element being driven by an electromagnetic circuit formed by the permanent magnets of the optical element and the electromagnetic driving means.

In accordance with another aspect of the present invention, there is provided a lens unit or a camera apparatus in which the aforesaid optical apparatus is integrally incorporated.

Other objects, features and advantages of the present invention will become apparent from the following detailed description of preferred embodiments of the present invention, taken in conjunction with the accompanying drawings. dr

BRIEF DESCRIPTION OF THE SEVERAL VIEWS OF THE DRAWING

FIG. 12 is a view aiding in explaining the pixel shifting operation of the pixel shifting system according to the first embodiment of the present invention;

DETAILED DESCRIPTION OF THE INVENTION

Preferred embodiments of the present invention will be described below in detail with reference to the accompanying drawings.

First of all, description will be made in connection with the operation principle of "pixel shifting" which makes it possible to pickup up an image of high image quality by shifting the incident position of light incident on an image pickup surface of an image pickup element, on a pixel-by-pixel basis on the image pickup surface.

Figure 17A:
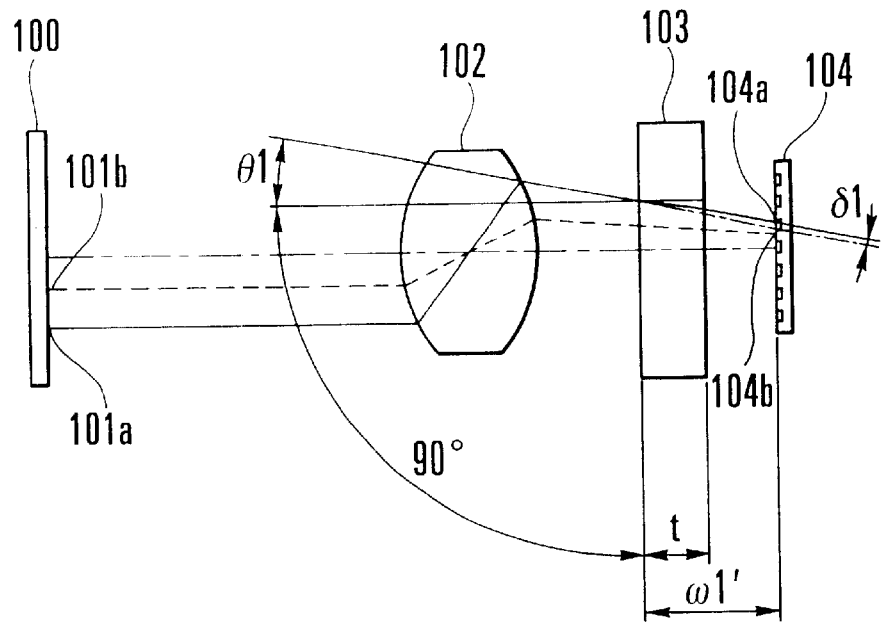
FIGS. 17(a) and 17(b) are views showing the principle of pixel shifting.

The principle of optical-path shifting which uses refraction of light by a parallel-plane plate optical transmission glass will be described below with reference to FIGS. 17(a) and 17(b). FIG. 17(a) shows a state before an optical path is shifted, while FIG. 17(b) shows a state after the optical path is shifted.

Figure 17B:
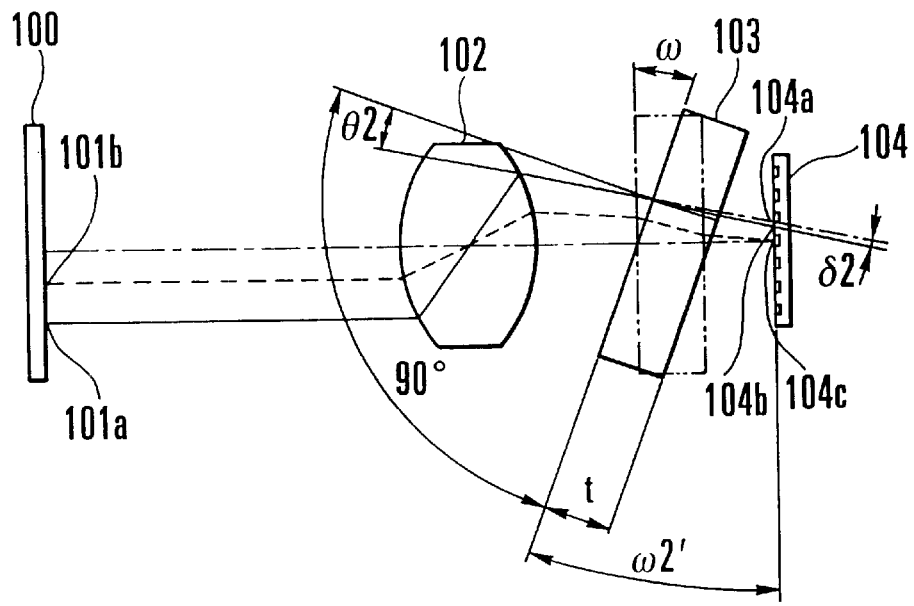

In FIGS. 17(a) and 17(b), reference numeral 100 denotes a subject such as a document, an image of which is to be picked up, reference numeral 102 denotes an image pickup lens unit, and reference numeral 103 denotes an optical element made of an optically transmissive substance. The optical element 103 is disposed so that it can incline with respect to the optical axis of the optical system, and is shaped like a parallel-plane plate having a uniform refractive index and serves as light-beam moving means. Reference numeral 104 denotes a solid-state image pickup element such as a CCD which serves as image pickup means for photoelectrically converting a light image of the subject 100 focused by the image pickup lens unit 102 and outputting the obtained picked-up image signal.

As shown in FIG. 17(a), light from a point 101a on the subject 100 passes through the lens unit 102 and the optical element 103 and is made incident on a photosensitive portion 104a of the solid-state image pickup element 104, so that the incident light is photoelectrically converted into valid data.

On the other hand, light from a point 101b on the subject 100 passes through the lens unit 102 and the optical element 103 and is made incident on a non-photosensitive portion 104 b between adjacent photosensitive portions of the solid-state image pickup element 104, but the incident light is not photoelectrically converted and is wasted as invalid data.

Letting δ1 be the amount of deviation of light between the direction in which the light enters the optical element 103 and the refraction direction in which the light exits from the optical element 103, letting θ1 be the angle made by the entering light and the normal to the entrance surface of the optical element 103, letting t be the thickness of the optical element 103, and letting N be the refractive index of the optical element 103, the following equation is obtained:

$$\delta 1=(1-1/N)\cdot t\cdot \theta 1.$$

The angle which the optical element 103 makes with the image pickup surface of the solid-state image pickup element 104 at this time is denoted by ω1' for convenience's sake.

FIG. 17(b) shows a state in which the optical element 103 is varied by an angle of ω=(ω2'−ω1').

In FIG. 17(b), letting 62 be the amount of deviation of light between the direction in which the light enters the optical element 103 and the refraction direction in which the light exits from the optical element 103, and letting θ2 be the angle made by the entering light and the normal to the entrance surface of the optical element 103, the following equation is obtained:

$$\delta 2=(1-1/N)\cdot t\cdot \theta 2,$$

where t is the thickness of the optical element 103 and N is the refractive index of the optical element 103.

Here, a deviation δ of the light which exits from the optical element 103 toward the solid-state image pickup element 104 when the optical system changes from the state of FIG. 17(a) to the state of FIG. 17(b) is expressed as follows:

$$\begin{aligned}\delta &= \delta 1 + \delta 2\\ &= (1-1/N)\cdot t \cdot (\theta 1 + \theta 2)\\ &= (1-1/N)\cdot t \cdot (\omega 2' - \omega 1'),\end{aligned}$$

so that $$\delta=(1-1/N)\cdot t\cdot \omega.$$

During the state of FIG. 17(a), the light information from the point 101b on the subject 100 is made incident on the non-photosensitive portion 104b on the solid-state image pickup element 104 and is wasted as invalid data. However, if the state of FIG. 17(a) is changed to the state of FIG. 17(b), it is possible to make the light information from the point 101b incident on a photosensitive portion 104c of the solid-state image pickup element 104, so that the light information can be used as valid data.

If the picked-up image data obtained in the state of FIG. 17(a) and the picked-up image data obtained in the state of FIG. 17(b) are stored in a memory and the stored data are combined after phase-corrected, it is possible to obtain the amount of data which is equivalent to twice the number of pixels of the solid-state image pickup element 104.

On the basis of the above-described principle, if the optical element 103 is made stationary at several inclination positions and light information received by the solid-state image pickup element 104 for each of the inclination positions is stored in the memory, it is possible to obtain image information the amount of which is equivalent to several times the number of photosensitive portions of the solid-state image pickup element 104.

The fundamental principle of "pixel shifting" itself is as described above, and preferred embodiments of the present invention will be described below.

(First Embodiment)

A first embodiment of the present invention comprises a horizontal shifting mechanism and a vertical shifting mechanism both of which are provided between an image pickup lens and an image pickup element (CCD), and the horizontal shifting mechanism includes a parallel-plane plate glass for shifting a light beam entering from the image pickup lens, in a horizontal direction on an image pickup surface of the image pickup element, whereas the vertical shifting mechanism includes a parallel-plane plate glass for shifting such light beam in a vertical direction on the image pickup surface of the image pickup element.

Figure 1B:
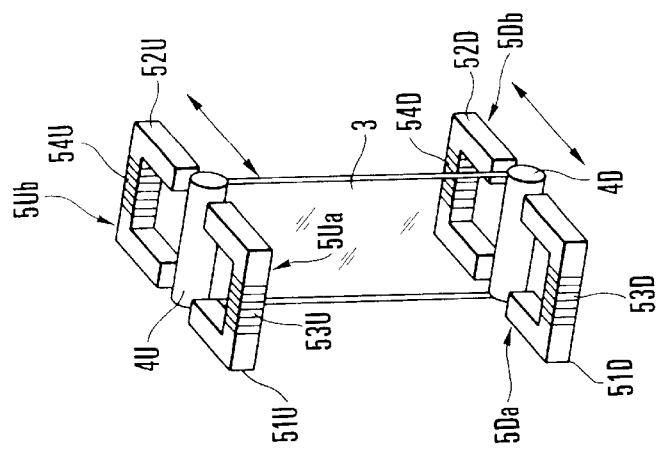
FIGS. 1(a) and 1(b) are diagrammatic perspective views aiding in explaining the arrangement and the operation principle of a pixel shifting system according to a first embodiment of the present invention.
Figure 1A:
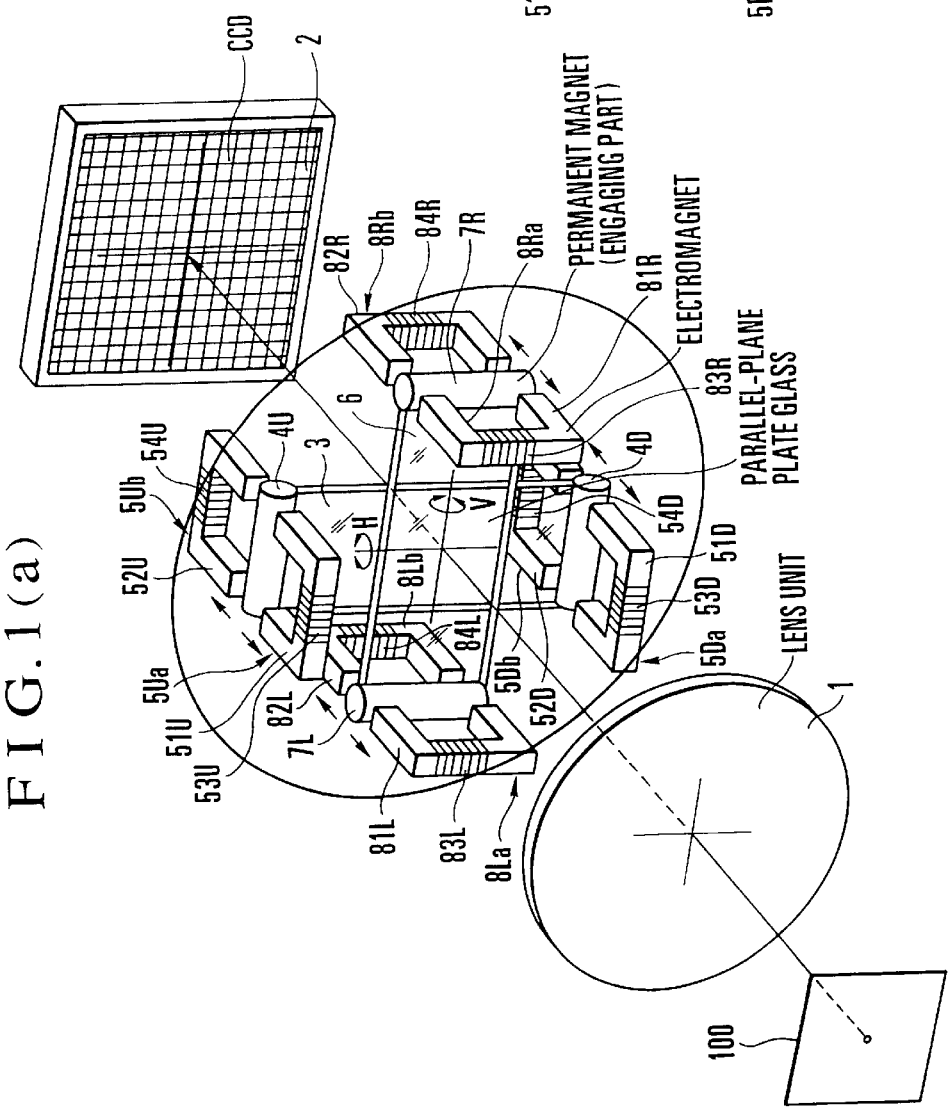

FIGS. 1(a) and 1(b) are diagrammatic perspective views showing the arrangement of a pixel shifting system in an image pickup apparatus according to the first embodiment of the present invention. In FIGS. 1(a) and 1(b), an image pickup lens unit 1 constitutes an optical system, and an image pickup element 2 such as a CCD constitutes image pickup means. A transmission parallel-plane plate glass 3 is made of glass or plastics and constitutes an optical element for vertically shifting a light beam passing through the image pickup lens unit 1 on an image pickup surface of the image pickup element 2. Permanent magnets 4U and 4D, each of which constitutes an engaging part, are respectively disposed at the opposite ends of the parallel-plane plate 3, and electromagnets 5Ua and 5Ub; 5Da and 5Db which constitute driving means for driving such optical element are respectively disposed before and behind the permanent magnets 4U and 4D in the direction of the optical axis. The incident position of the light beam on the image pickup surface can be vertically shifted up or down by controlling the respective electromagnets 5Ua, 5Ub, 5Da and 5Db to control the state of inclination of the parallel-plane plate 3 and rotating the parallel-plane plate 3 in either of the directions indicated by a double-headed arrow V.

The electromagnet 5Ua is composed of a yoke 51U and a coil 53U, and the electromagnet 5Ub is composed of a yoke 52U and a coil 54U. The electromagnets 5Ua and 5Ub constitute electromagnetic driving means for moving the permanent magnet 4U provided at the top end of the parallel-plane plate 3, back and forth in the direction of the optical axis. In such electromagnetic driving means, the supply of electricity to the coils 53U and 54U of the electromagnets 5Ua and 5Ub and the direction in which current flows through each of the same coils 53U and 54U are controlled to invert the magnetization polarities of the opposite end portions of each of the yokes 51U and 52U, thereby varying the relationship between such magnetization polarities and the magnetization polarities of the permanent magnet 4U to move the permanent magnet 4U back and forth in the direction of the optical axis by the obtained attractive and repulsive forces.

The electromagnet 5Da is composed of a yoke 51D and a coil 53D, and the electromagnet 5Db is composed of a yoke 52D and a coil 54D. The electromagnets 5Da and 5Db constitute electromagnetic driving means for moving the permanent magnet 4D provided at the bottom end of the parallel-plane plate 3, back and forth in the direction of the optical axis. In such electromagnetic driving means, the supply of electricity to the coils 53D and 54D of the electromagnets 5Da and 5Db and the direction in which current flows through each of the same coils 53D and 54D are controlled to invert the magnetization polarities of the opposite end portions of each of the yokes 51D and 52D, thereby varying the relationship between such magnetization polarities and the magnetization polarities of the permanent magnet 4D to move the permanent magnet 4D back and forth in the direction of the optical axis by the obtained attractive and repulsive forces.

Figure 18A:
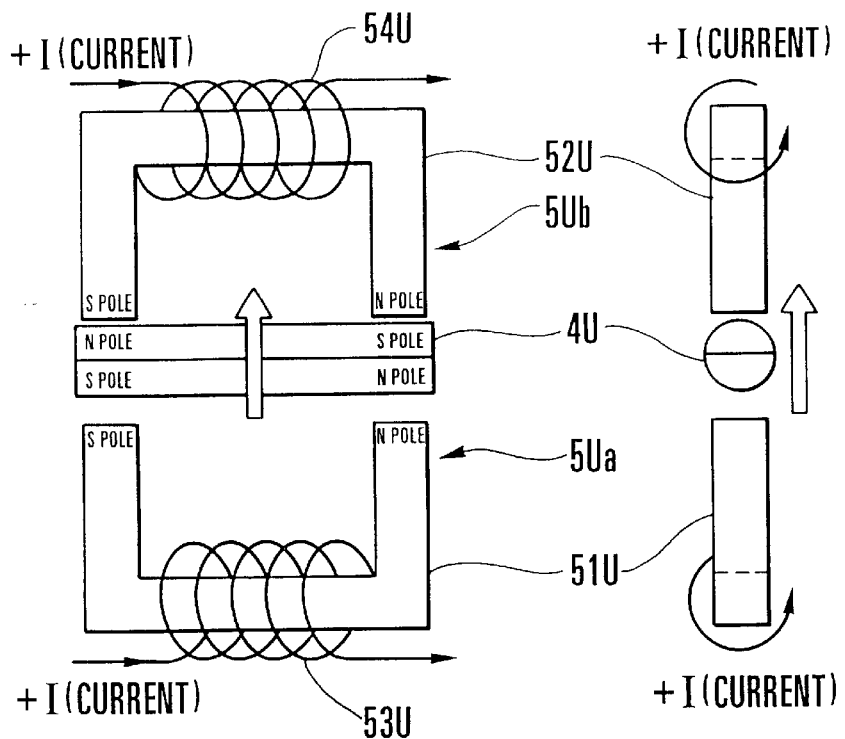
FIGS. 18(a) and 18(b) are views aiding in explaining the principle of a driving method for pixel shifting according to the present invention.

FIGS. 18(a) and 18 (b) are views aiding in explaining such electromagnetic driving means, and representatively show the electromagnet 5Ua and 5Ub and the permanent magnet 4U for convenience of explanation.

Referring to FIG. 18(a), the permanent magnet 4U is made from a permanent magnet prepared by permanently magnetizing a cylindrical rod by the use of, for example, a radially anisotropic or isotropic magnet made of samarium cobalt or neodymium with magnetic poles being inverted at the opposite ends of the cylindrical rod as shown in FIG. 18(a). Otherwise, a steel rod having such magnets at its opposite ends may be used in such a manner that one of the magnets is located between one end of the yoke 51U and the opposed end of the yoke 52U, while the other magnet is located between the other end of the 51U and the opposed end of the yoke 52U. Otherwise, the periphery of such magnet may be formed by molding or the like. What is essential is that a permanent magnet, which has particular magnetic poles formed in its particular portions to be respectively interposed between the opposite ends of the yoke 51U and the corresponding ends of the yoke 52U, is disposed between the yoke 51U and the yoke 52U.

In FIG. 18(a), if a current flows through the electromagnetic coil 54U wound around the yoke 52U of the electromagnet 5Ub and the opposite end portions of the yoke 52U are magnetized as shown in FIG. 18(a) (the left and right end portions are magnetized to have the S pole and the N pole, respectively, as viewed in FIG. 18(a)), the direction of such current is assumed to be a plus direction. Similarly, if a current flows through the electromagnetic coil 53U wound around the yoke 51U of the electromagnet 5Ua and the opposite end portions of the yoke 51U are magnetized as shown in FIG. 18(a) (the left and right end portions are magnetized to have the S pole and the N pole, respectively, as viewed in FIG. 18(a)), the direction of such current is assumed to be a plus direction.

At this time, an attractive force acts between the permanent magnet 4U and the yoke 52U by the magnetization of the yoke 52U of the electromagnet 5Ub so that the permanent magnet 4U is attracted to the yoke 52U, while a repulsive force acts between the permanent magnet 4U and the yoke 51U by the magnetization of the yoke 51U of the electromagnet 5Ua so that the permanent magnet 4U is moved away from the yoke 51U. Thus, the permanent magnet 4U is instantaneously moved upwardly as viewed in FIG. 18(a) by these two forces.

Figure 18B:
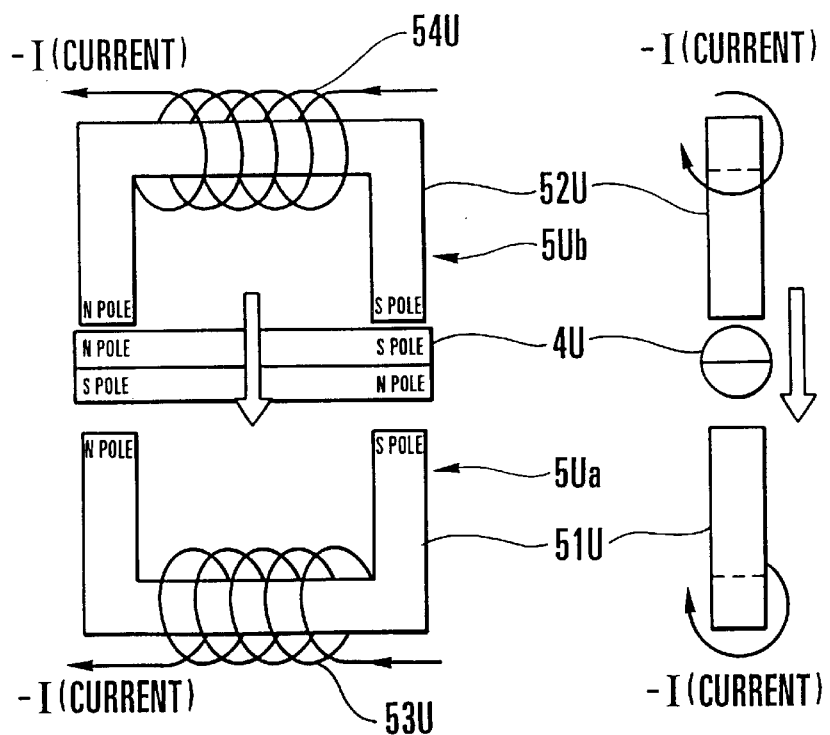

In FIG. 18(b), if a current flows through the electromagnetic coil 54U wound around the yoke 52U of the electromagnet 5Ub and the opposite end portions of the yoke 52U are magnetized as shown in FIG. 18(b) (the left and right end portions are magnetized to have the N pole and the S pole, respectively, as viewed in FIG. 18(b)), the direction of such current is assumed to be a minus direction. Similarly, if a current flows through the electromagnetic coil 53U wound around the yoke 51U of the electromagnet 5Ua and the opposite end portions of the yoke 51U are magnetized as shown in FIG. 18(b) (the left and right end portions are magnetized to have the N pole and the S pole, respectively, as viewed in FIG. 18(b)), the direction of such current is assumed to be a minus direction.

At this time, a repulsive force acts between the permanent magnet 4U and the yoke 52U by the magnetization of the yoke 52U of the electromagnet 5Ub so that the permanent magnet 4U is moved away from the yoke 52U, while an attractive force acts between the permanent magnet 4U and the yoke 51U by the magnetization of the yoke 51U of the electromagnet 5Ua so that the permanent magnet 4U is attracted to the yoke 51U. Thus, the permanent magnet 40 is instantaneously moved downwardly as viewed in FIG. 18(b) by these two forces.

If the inclination angle of the parallel-plane plate 3 is varied by moving the top and bottom portions of the parallel-plane plate 3 back and forth in the direction of the optical axis by controlling the energization and deenergization and the current-flow directions of the respective electromagnets 5Ua and 5Ub; 5Da and 5Db, the incident position of incident light, which has passed through the parallel-plane plate 3, on the image pickup surface of the image pickup element 2 can be shifted vertically (up or down) with respect to the direction of the optical axis.

A parallel-plane plate glass 6 is provided for horizontally shifting a light beam passing through the image pickup lens unit 1 on the image pickup surface. Permanent magnets 7L and 7R, each of which constitutes a cylindrical member serving as an engaging part, are respectively disposed at the opposite ends of the parallel-plane plate 6, and electromagnets 8La and 8Lb; 8Ra and 8Rb are respectively disposed before and behind the permanent magnets 7L and 7R in the direction of the optical axis. The incident position of the light beam on the image pickup surface can be horizontally shifted toward the right or the left by controlling the respective electromagnets 8La, 8Lb, 8Ra and 8Rb to control the state of inclination of the parallel-plane plate 6 and rotating the parallel-plane plate 6 in either of the directions indicated by a double-headed arrow H.

The electromagnet 8La is composed of a yoke 81L and a coil 83L, and the electromagnet 8Lb is composed of a yoke 82L and a coil 84L. The electromagnets 8La and 8Lb constitute electromagnetic driving means, i.e., driving means for moving the permanent magnet 7L provided at the left end of the parallel-plane plate 6, back and forth in the direction of the optical axis. In such electromagnetic driving means, the supply of electricity to the coils 83L and 84L of the electromagnets 8La and 8Lb and the direction in which current flows through each of the same coils 83L and 84L are controlled to invert the magnetization polarities of the opposite end portions of each of the yokes 81L and 82L, thereby varying the relationship between such magnetization polarities and the magnetization polarities of the permanent magnet 7L to move the permanent magnet 7L back and forth in the direction of the optical axis by the obtained attractive and repulsive forces.

The electromagnet 8Ra is composed of a yoke 81R and a coil 83R, and the electromagnet 8Rb is composed of a yoke 82R and a coil 84R. The electromagnets 8Ra and 8Rb constitute electromagnetic driving means, i.e., driving means for moving the permanent magnet 7R provided at the right end of the parallel-plane plate 6, back and forth in the direction of the optical axis. In such electromagnetic driving means, the supply of electricity to the coils 83R and 84R of the electromagnets 8Ra and 8Rb and the direction in which current flows through each of the same coils 83R and 84R are controlled to invert the magnetization polarities of the opposite end portions of each of the yokes 81R and 82R, thereby varying the relationship between such magnetization polarities and the magnetization polarities of the permanent magnet 7R to move the permanent magnet 7R back and forth in the direction of the optical axis by the obtained attractive and repulsive forces.

If the inclination angle of the parallel-plane plate 6 is varied by moving the right and left portions of the parallel-plane plate 6 back and forth in the direction of the optical axis by controlling the energization and deenergization and the current-flow directions of the respective electromagnets 8R*a* and 8R*b*; 8L*a* and 8L*b*, the incident position of incident light, which has passed through the parallel-plane plate 6, on the image pickup surface of the image pickup element 2 can be shifted horizontally (toward the right or the left) with respect to the direction of the optical axis.

The two vertical and horizontal parallel-plane plates 3 and 6 are disposed in the space between the image pickup lens unit 1 and the image pickup element 2 in such a manner that the respective parallel-plane plates 3 and 6 are made to incline with respect to the vertical and horizontal directions, thereby shifting the position of incidence on the image pickup surface of the light beam which has passed through the image pickup lens unit 1, in the vertical and horizontal directions at a pitch smaller than the pixel-to-pixel distance of the image pickup element 2. Accordingly, the image pickup apparatus can pick up an image which is incident on the image pickup surface at a location between each pixel of the image pickup element 2, so that the image pickup apparatus is capable of realizing an image quality equivalent to that of an image picked up by an image pickup element, the number of pixels of which is greater than the actual number of pixels of the image pickup element 2.

The detailed arrangement and the operation of the pixel shifting system according to the first embodiment will be described below with reference to FIGS. 2(*a*), 2(*b*) and 2(*c*) to 12.

Figure 2A:
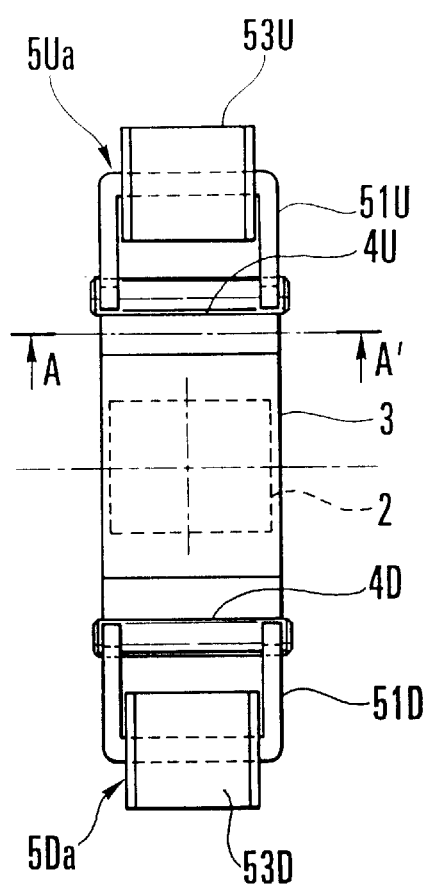
FIGS. 2(a), 2(b) and 2(c) are diagrammatic views aiding in explaining the arrangement and the operation principle of the pixel shifting system according to the first embodiment of the present invention.
Figure 2B:
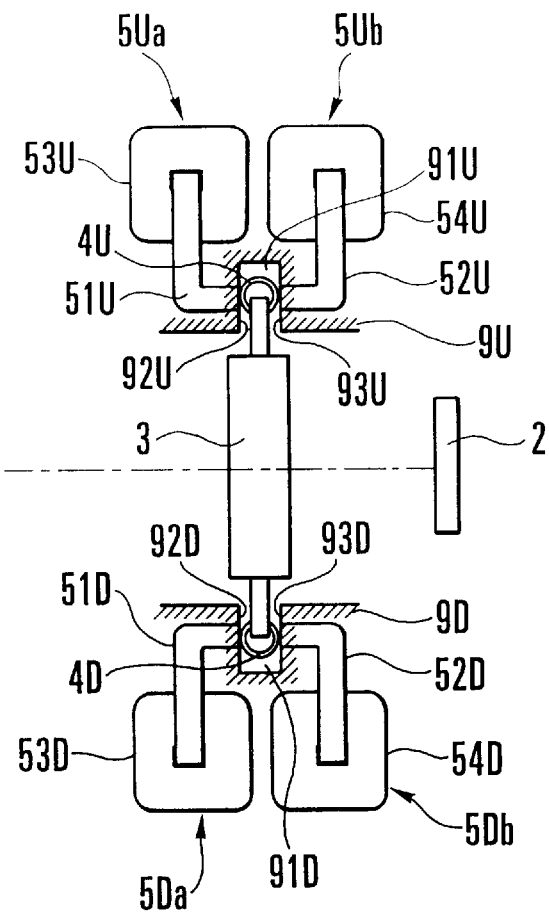
Figure 2C:
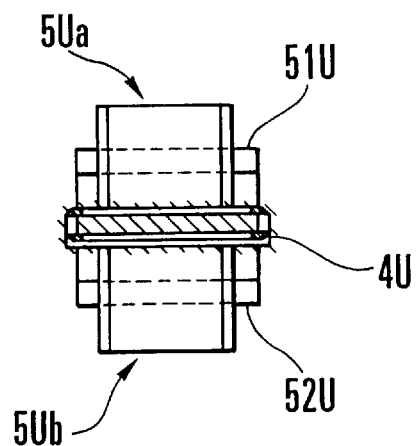

FIGS. 2(*a*), 2(*b*) and 2(*c*) show the arrangement of the parallel-plane plate 3 which performs vertical pixel shifting.

The pixel shifting system according to the first embodiment is disposed between the image pickup lens unit 1 and the image pickup element 2. In practice, the pixel shifting system may be disposed, for example, in the lens barrel of a camera or in the camera body thereof.

FIG. 2(*a*) shows the state of the parallel-plane plate 3 as viewed from the front side, i.e., in the direction of incidence of a light beam, while FIG. 2(*b*) shows the state of the parallel-plane plate 3 as viewed from the right side. As shown in FIG. 2(*a*), the parallel-plane plate 3 is positioned in front of the image pickup surface of the image pickup element 2, and has a size which covers the entire image pickup surface.

The top and bottom permanent magnets 4U and 4D of the parallel-plane plate 3 are located in a frame portion of the lens barrel or a frame portion of the camera body.

As shown in FIG. 2(*b*), the parallel-plane plate 3 is held in the state in which the permanent magnets 4U and 4D provided at the opposite ends of the parallel-plane plate 3 are respectively movably fitted in recesses 91U and 91D formed in the frame portion, i.e., in the state of having predetermined clearances in the forward and rearward directions and in the upward and downward directions.

Each of the recesses 91U and 91D is extended by a length approximately equal to the width of the parallel-plane plate 3 in a direction perpendicular to the surface of the sheet of FIG. 2(*b*), and the permanent magnets 4U and 4D provided at the opposite ends of the parallel-plane plate 3 are formed into cylindrical shapes which respectively extend along inner surfaces 92U and 93U of the recess 91U and inner surfaces 92D and 93D of the recess 91D. Accordingly, the permanent magnets 4U and 4D can come into line contact with restriction surfaces in the respective recesses 91U and 91D so that the inclination of the parallel-plane plate 3 with respect to the rolling direction can be restricted. As another method for obtaining the same effect as the line contact due to the cylindrical shape, a plurality of point contact portions may be formed on the line of the line contact.

These recesses 91U and 91D function as restriction portions for positioning the optical element of the present invention, and the surfaces which come into abutment with the permanent magnets which constitute the engaging parts of the parallel-plane plate serving as the optical element function as position restricting surfaces for positioning.

By bringing the permanent magnet 4U into abutment with either of the inner surfaces 92U and 93U which are respectively arranged in the recess 91U along the optical axis, i.e., located on the left and right sides as viewed in FIG. 2(*b*), and by bringing the permanent magnet 4D into abutment with either of the inner surfaces 92D and 93D which are respectively arranged in the recess 91D along the optical axis, i.e., located on the left and right sides as viewed in FIG. 2(*b*), the inclination position of the parallel-plane plate 3 with respect to the optical axis is determined, and the respective amounts of movements along the optical axis of the permanent magnets 4U and 4D provided at the opposite ends of the parallel-plane plate 3 are determined according to the respective widths of the recesses 91U and 91D which are taken in the direction of the optical axis. In consequence, the parallel-plane plate 3 is controlled so that the amount of inclination of the parallel-plane plate 3 is made different.

The present pixel shifting system also includes the parallel-plane plate 6 which has an arrangement similar to the above-described one for the purpose of horizontal pixel shifting. The positional relation between the parallel-plane plate 3 and the parallel-plane plate 6 is shown in FIGS. 3(*a*) and 3(*b*).

Figure 3A:
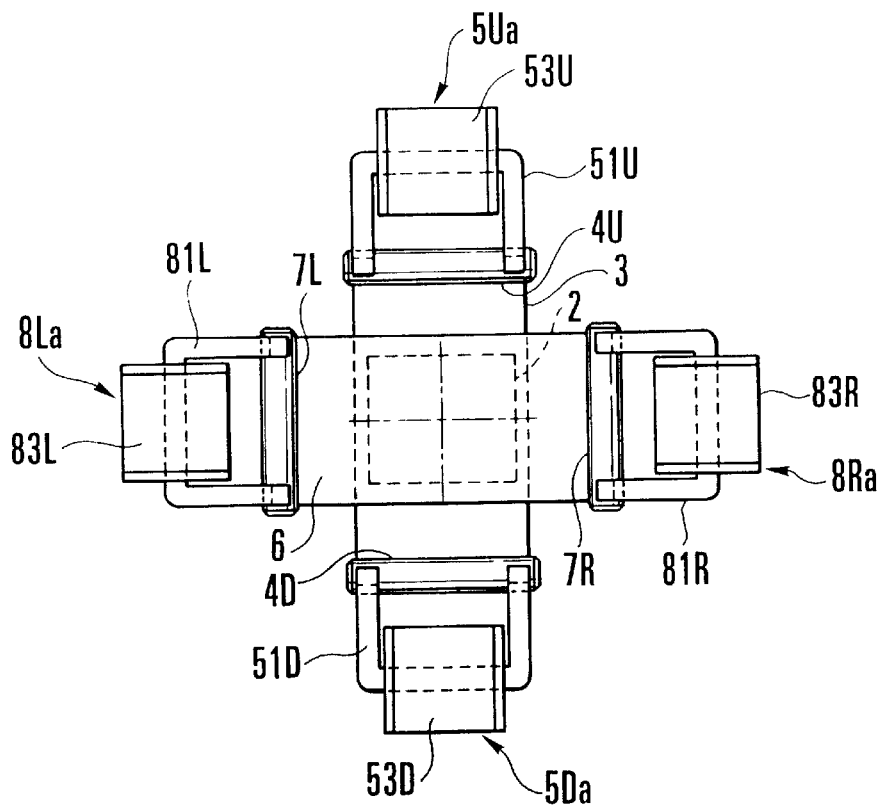
FIGS. 3(a) and 3(b) are diagrammatic views aiding in explaining the arrangement and the operation principle of the pixel shifting system according to the first embodiment of the present invention.
Figure 3B:
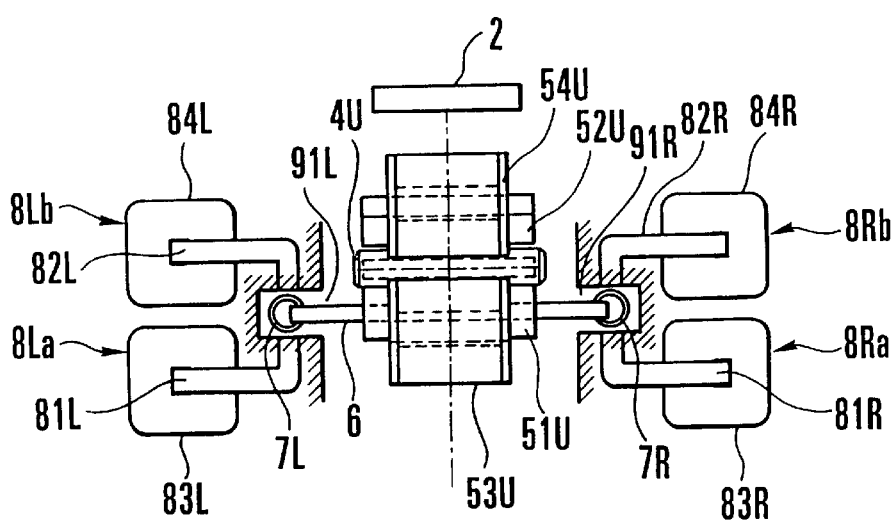

FIG. 3(*a*) is a front elevational view taken in the direction of the optical axis, and FIG. 3(*b*) is a top plan view. As can also be seen from FIG. 1(*a*), the parallel-plane plate 6 for horizontal pixel shifting and the parallel-plane plate 3 for vertical pixel shifting are disposed in a perpendicular relation to each other between the image pickup lens unit 1 and the image pickup element 2.

The main feature of the pixel shifting system according to the first embodiment resides in the arrangement in which a multiplicity of inclination positions of each of the parallel-plane plates can be obtained by restricting the inclination position of each of the parallel-plane plates by means of the permanent magnets provided at the opposite ends and the corresponding recesses, and in which the electromagnets and the permanent magnets are used as driving sources for the parallel-plane plates and each of the parallel-plane plates is disposed in such a manner that the permanent magnets at the opposite ends are movably fitted in the corresponding recesses. In operation, the position of each of the parallel-plane plates is restricted by the attractive and repulsive forces produced by the relationship between the electromagnetic magnetization poles of the electromagnets and the electromagnetic magnetization poles of the permanent magnets. If the electromagnets are not excited, the parallel-plane plates are held at their electromagnetically deenergized positions by the magnetic forces of the permanent magnets. Accordingly, there is no need for a special arrangement for supporting the parallel-plane plates when the electromagnets are not excited. With such a supporting arrangement, unlike a conventional system, it is possible to omit a gimbal mechanism having vertical and horizontal rotating shafts and the like.

Each of the parallel-plane plates 3 and 6 is merely movably fitted in the corresponding recesses, and there is no need for a special supporting mechanism such as a gimbal. In addition, since electromagnetic forces are directly applied to the respective permanent magnets as driving forces, there is no need for a mechanism for transmitting the driving forces, so that not only can the arrangements of the parallel-plane plates 3 and 6 be made simple but also the parallel-plane plates 3 and 6 can be driven at extremely high speeds and their positions can be controlled with high accuracy.

FIGS. 4 to 7 are views aiding in explaining the control of the inclination position of the parallel-plane plate 3 which performs vertical pixel shifting. The main feature of the arrangement of the first embodiment resides in the relative positional relation between the recesses 91U and 91D and the setting of the width of each of the recesses 91U and 91D.

FIGS. 4 to 7 respectively show different inclination positions of the parallel-plane plate 3 for sequentially shifting down the incident position of a light beam which corresponds to one point on a subject, on the image pickup surface of the image pickup element 2.

Figure 4:
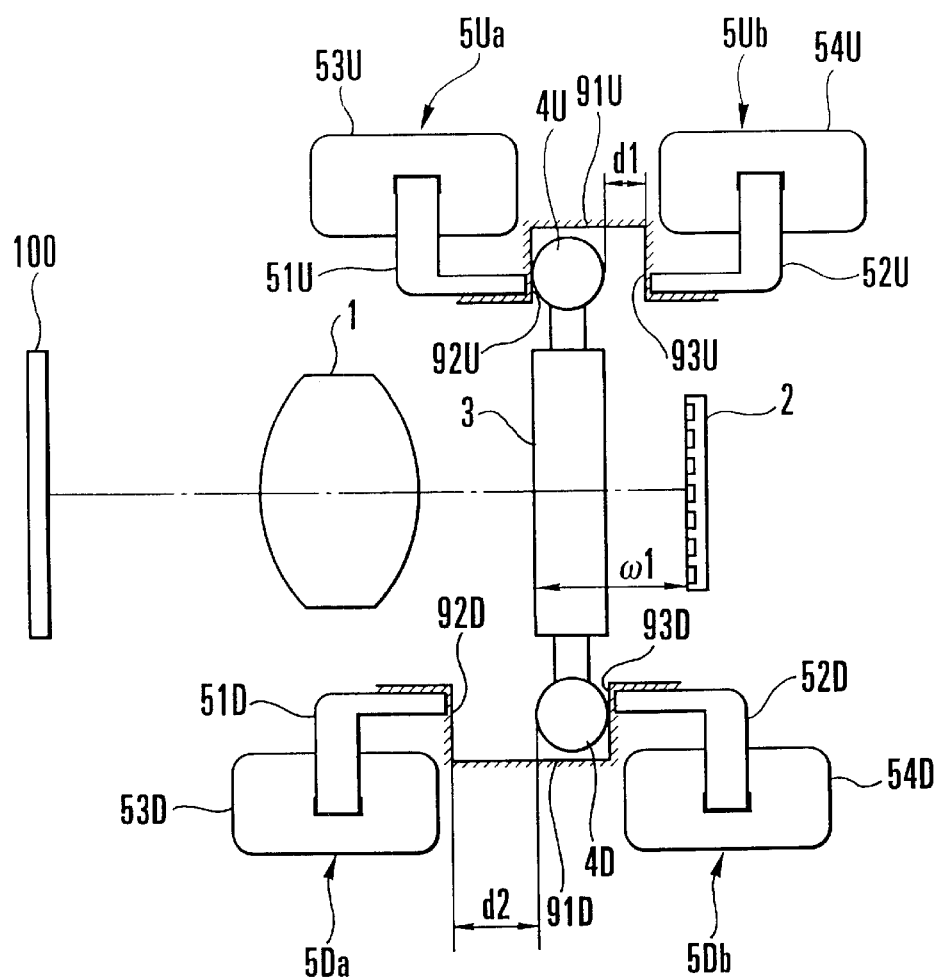
FIG. 4 is a diagrammatic view aiding in explaining the vertical pixel shifting operation of the pixel shifting system according to the first embodiment of the present invention.

Referring to FIG. 4, the dimensions of the recess 91U in which the permanent magnet 4U provided at the top end of the parallel-plane plate 3 is movably fitted and those of the recess 91D in which the permanent magnet 4D provided at the bottom end of the parallel-plane plate 3 is movably fitted are set in such a manner that the widths of the recesses 91U and 91D, i.e., the lengths of the recesses 91U and 91D in the direction of the optical axis, are approximately equal to each other, and the positions of the recesses 91U and 91D are approximately the same as each other.

Referring to the upper portion of FIG. 4, the current-flow direction of the coil 53U is controlled so that an attractive force acts between the electromagnet 5Ua and the permanent magnet 4U, while the current-flow direction of the coil 54U is controlled so that a repulsive force acts between the electromagnet 5Ub and the permanent magnet 4U. Therefore, in the recess 91U, the permanent magnet 4 u is attracted to the yoke 51U of the electromagnet 5Ua and positioned by abutment with the position restricting surface 92U which is located before the permanent magnet 4U in the direction of the optical axis. Referring to the lower portion of FIG. 4, the current-flow direction of the coil 53D is controlled so that a repulsive force acts between the electromagnet 5Da and the permanent magnet 4D, while the current-flow direction of the coil 54D is controlled so that an attractive force acts between the electromagnet 5Db and the permanent magnet 4D. Therefore, in the recess 91D, the permanent magnet 4D is attracted to the yoke 52D of the electromagnet 5Db and positioned by abutment with the position restricting surface 93D which is located behind the permanent magnet 4D in the direction of the optical axis.

In the first embodiment, when the pixel shifting system is in the state shown in FIG. 4, the parallel-plane plate 3 is set to be positioned in a relation perpendicular to the optical axis, but none of the states of inclination shown in FIGS. 4, 5, 6 and 7 are absolute. The present pixel shifting system is intended to allow an image, which originally cannot be incident on the image pickup surface, to be made incident thereon according to the inclination angle of the parallel-plane plate 3, and the parallel-plane plate 3 need not be perpendicular to the optical axis in any of the states shown in FIGS. 4, 5, 6 and 7.

Letting d1 be the clearance between the permanent magnet 4U and the width of the recess 91U, i.e., the distance between the permanent magnet 4U and the position restricting surface 93U in the recess 91U, and letting d2 be the clearance between the permanent magnet 4D and the width of the recess 91D, i.e., the distance between the permanent magnet 4D and the position restricting surface 92D in the recess 91D, the relation between d1 and d2 is set to d2=2d1, i.e., the distance d2 is twice as large as the distance d1.

In FIG. 4, ω1 denotes the angle made by the parallel-plane plate 3 and the image pickup surface of the image pickup element 2. Incidentally, the distances d1 and d2 are set with high precision. Although the sizes of the permanent magnets 4U, 4D and the like are also set with high precision, there are many cases in which high precision is impossible to obtain with only the aforesaid types of magnets. To cope with such cases, the portions of each of the permanent magnets that are required to have a far higher precision, for example, abutment portions for abutment with the corresponding position restricting surfaces may be formed from a steel rod or by molding or the like. What is essential is that a permanent magnet having a particular magnetic pole is disposed in a portion between one yoke and the opposed yoke.

Figure 19A:
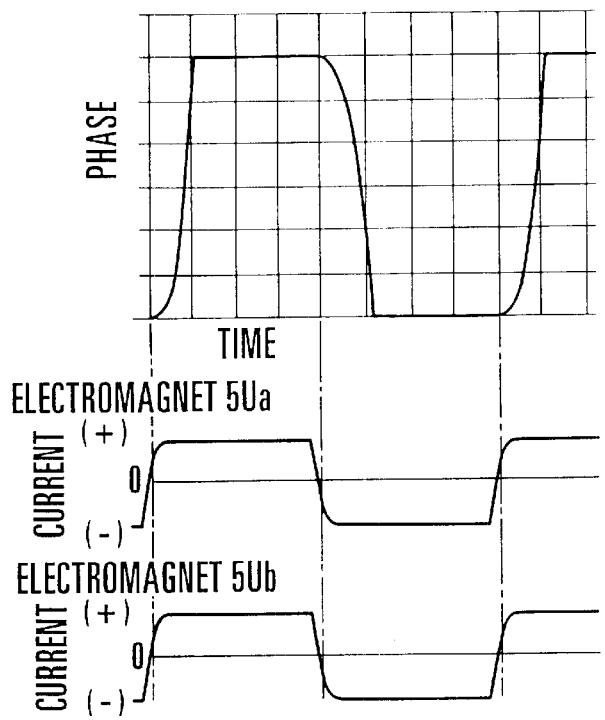
FIGS. 19(a) and 19(b) are views aiding in explaining the way of increasing the speed of a driving operation for pixel shifting according to the present invention.

FIG. 19(a) shows a waveform representing the moving speed of the permanent magnet 4U, and the horizontal axis represents time, while the vertical axis represents phase. The two waveforms shown in the lower portion of FIG. 19(a) represent those of the respective electromagnet 5Ua and the electromagnet 5Ub, with the inversions of their energizations and their current-flow directions being plotted against the same time axis.

Figure 19B:
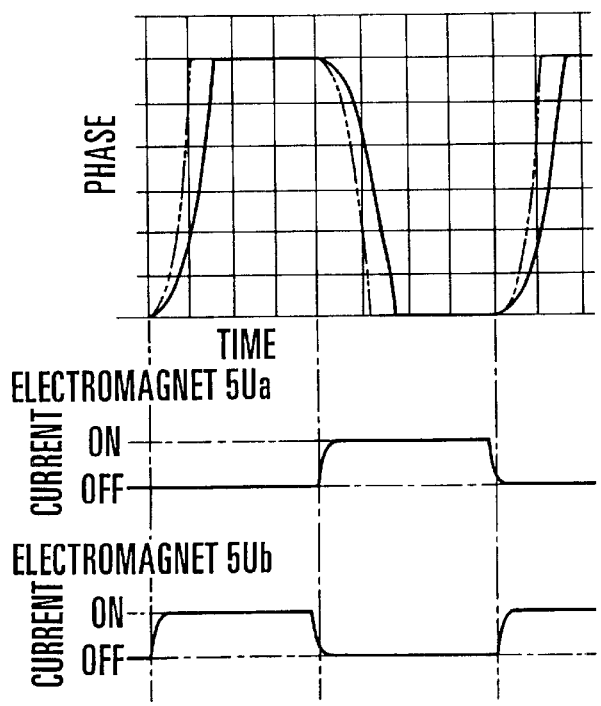

FIG. 19(b) comparatively shows the waveform representing the moving speed of the permanent magnet 4U and a waveform representing a moving speed obtainable in an arrangement in which, for example, the permanent magnet 4U is replaced with a mere armature to be electromagnetically attracted by the electromagnets 5Ua and 5Ub, which armature uses only a steel rod of electromagnetic soft iron or the like. In FIG. 19(b), the horizontal and vertical axes represent time and phase, respectively. The two waveforms shown in the lower portion of FIG. 19(b) represent those of the respective electromagnet 5Ua and the electromagnet 5Ub, with the inversions of their energizations and their current-flow directions being plotted against the same time axis. As is apparent from FIGS. 19(a) and 19(b) whose scales are the same, the moving speed of the permanent magnet 4U is evidently higher than that of the armature made from a mere steel rod.

In the state shown in FIG. 4, if the electromagnets 5Ua and 5Ub are excited in such a manner that the current-flow direction of the coil 53U is inverted so that a repulsive force acts between the electromagnet 5Ua and the permanent magnet 4U, while the current-flow direction of the coil 54U is inverted so that an attractive force acts between the electromagnet 5Ub and the permanent magnet 4U, the permanent magnet 4U provided at the top end of the parallel-plane plate 3 moves away from the position restricting surface 92U in the recess 91U and is attracted to the position restricting surface 93U and positioned by abutment with the position restricting surface 93U. Thus, the parallel-plane plate 3 goes to the state shown in FIG. 5.

Figure 5:
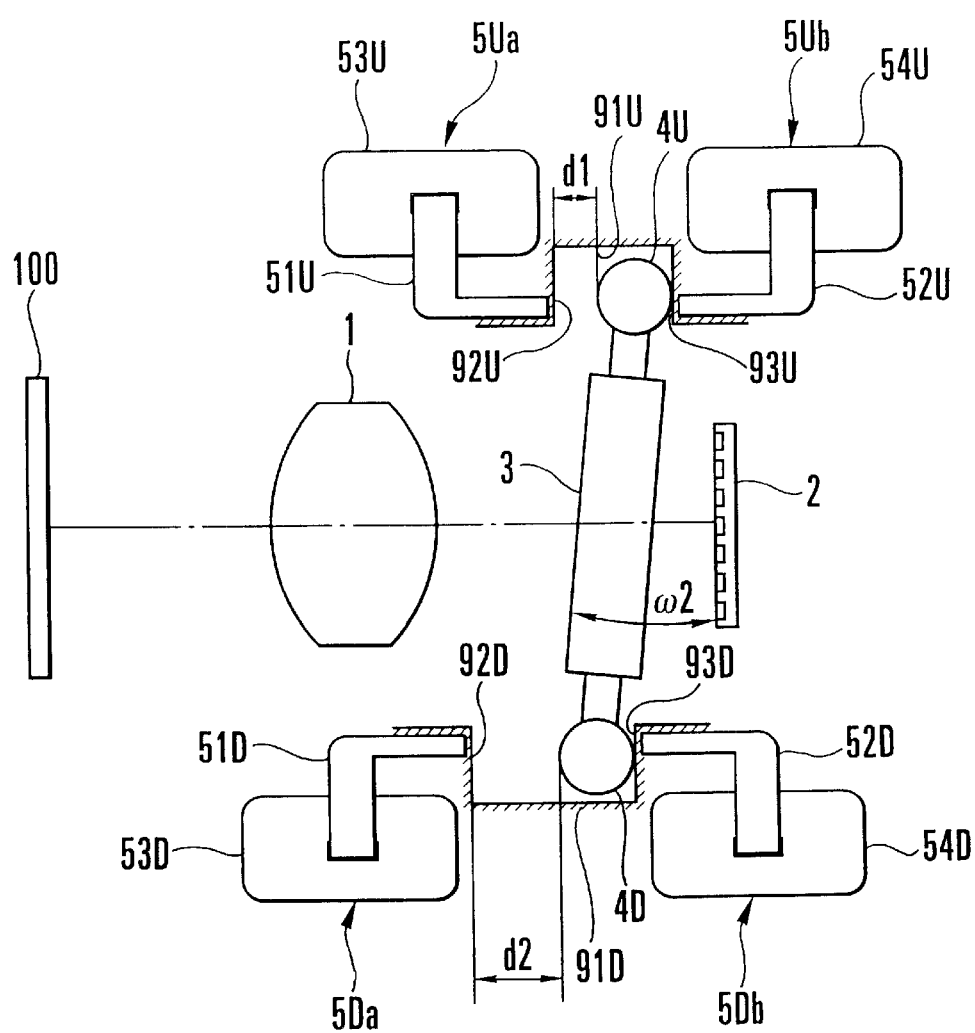
FIG. 5 is a diagrammatic view aiding in explaining the vertical pixel shifting operation of the pixel shifting system according to the first embodiment of the present invention.

In the state shown in FIG. 5, the inclination position of the parallel-plane plate 3 is restricted by the abutment between the permanent magnet 4U provided at the top end of the parallel-plane plate 3 and the position restricting surface 93U in the recess 91U and by the abutment between the permanent magnet 4D provided at the bottom end of the parallel-plane plate 3 and the position restricting surface 93D in the recess 91D. Specifically, the parallel-plane plate 3 is inclined from the state of FIG. 4 toward the right by one step as viewed in FIG. 4, and the incident position of the light beam on the image pickup surface of the image pickup element 2 is shifted downward on the image pickup surface. Incidentally, ω2 denotes the angle made by the image pickup surface and the parallel-plane plate 3 in the state shown in FIG. 5.

In the state shown in FIG. 5, if the current-flow direction of the coil 54U is inverted so that a repulsive force acts between the electromagnet 5U*b* of the recess 91U and the permanent magnet 4U, while the current-flow direction of the coil 53U is inverted so that an attractive force acts between the electromagnet 5U*a* and the permanent magnet 4U, the permanent magnet 4U moves away from the position restricting surface 93U in the recess 91U and is attracted to the position restricting surface 92U and positioned by abutment with the position restricting surface 92U.

In addition, if the current-flow direction of the coil 54D is inverted so that a repulsive force acts between the electromagnet 5D*b* of the recess 91D and the permanent magnet 4D, while the current-flow direction of the coil 53D is inverted so that an attractive force acts between the electromagnet 5D*a* and the permanent magnet 4D, the permanent magnet 4D provided at the bottom end of the parallel-plane plate 3 moves away from the position restricting surface 93D in the recess 91D and is attracted to the position restricting surface 92D and positioned by abutment with the position restricting surface 92D. Thus, the parallel-plane plate 3 goes to the state shown in FIG. 6.

Figure 6:
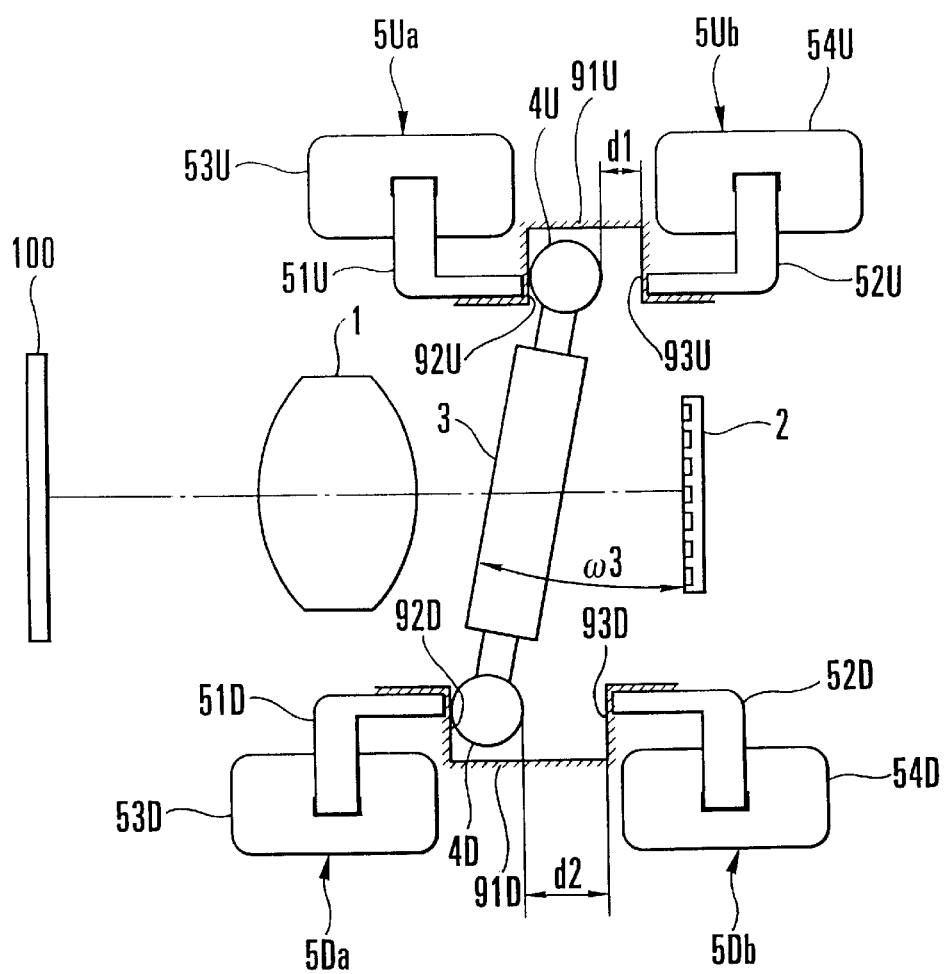
FIG. 6 is a diagrammatic view aiding in explaining the vertical pixel shifting operation of the pixel shifting system according to the first embodiment of the present invention.

In the state shown in FIG. 6, the inclination position of the parallel-plane plate 3 is restricted by the abutment between the permanent magnet 4U provided at the top end of the parallel-plane plate 3 and the position restricting surface 92U in the recess 91U and by the abutment between the permanent magnet 4D provided at the bottom end of the parallel-plane plate 3 and the position restricting surface 92D in the recess 91D. Specifically, the parallel-plane plate 3 is further inclined from the state of FIG. 5 toward the right by one step as viewed in FIG. 5, and the incident position of the light beam on the image pickup surface of the image pickup element 2 is shifted further downward on the image pickup surface. Incidentally, ω3 denotes the angle made by the image pickup surface and the parallel-plane plate 3 in the state shown in FIG. 6.

In the state shown in FIG. 6, if the current-flow direction of the coil 53U is inverted so that a repulsive force acts between the electromagnet 5U*a* and the permanent magnet 4U, while the current-flow direction of the coil 54U is inverted so that an attractive force acts between the electromagnet 5U*b* and the permanent magnet 4U, the permanent magnet 4U provided at the top end of the parallel-plane plate 3 moves away from the position restricting surface 92U in the recess 91D and is attracted to the position restricting surface 93U and positioned by abutment with the position restricting surface 93U. In addition, the permanent magnet 4D provided at the bottom end of the parallel-plane plate 3 is positioned by abutment with the position restricting surface 92D. Thus, the parallel-plane plate 3 goes to the state shown in FIG. 7.

Figure 7:
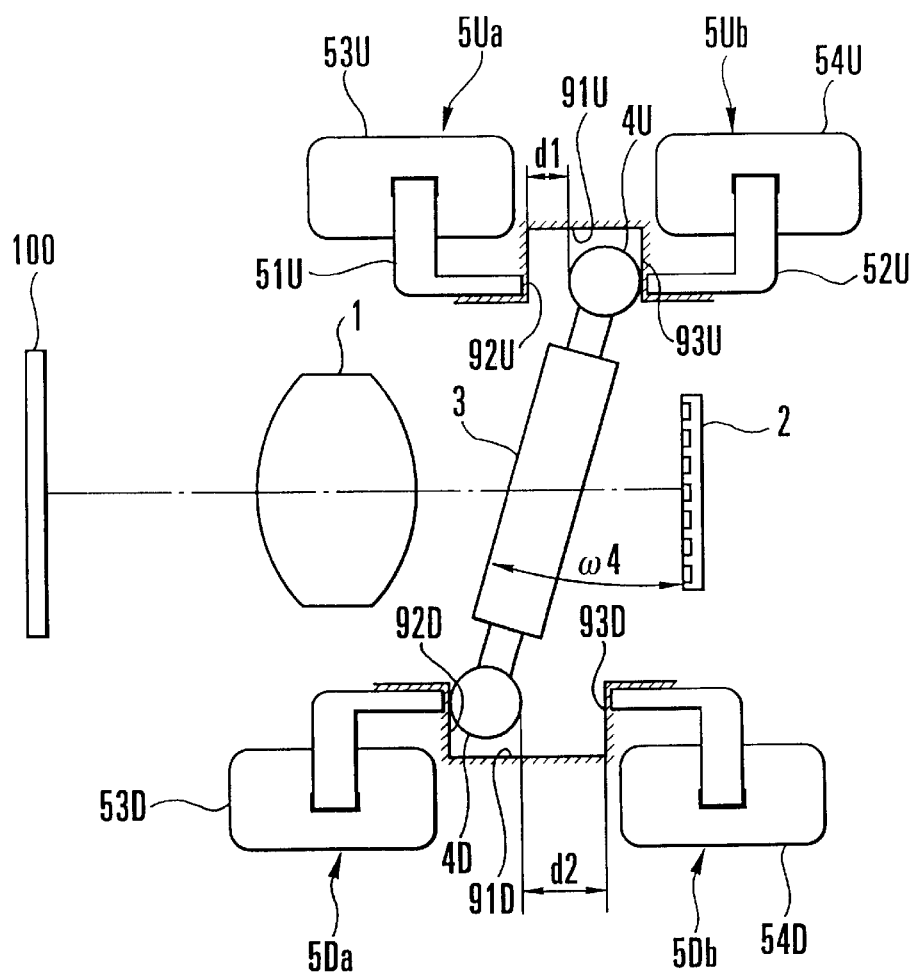
FIG. 7 is a diagrammatic view aiding in explaining the vertical pixel shifting operation of the pixel shifting system according to the first embodiment of the present invention.
Figure 8:
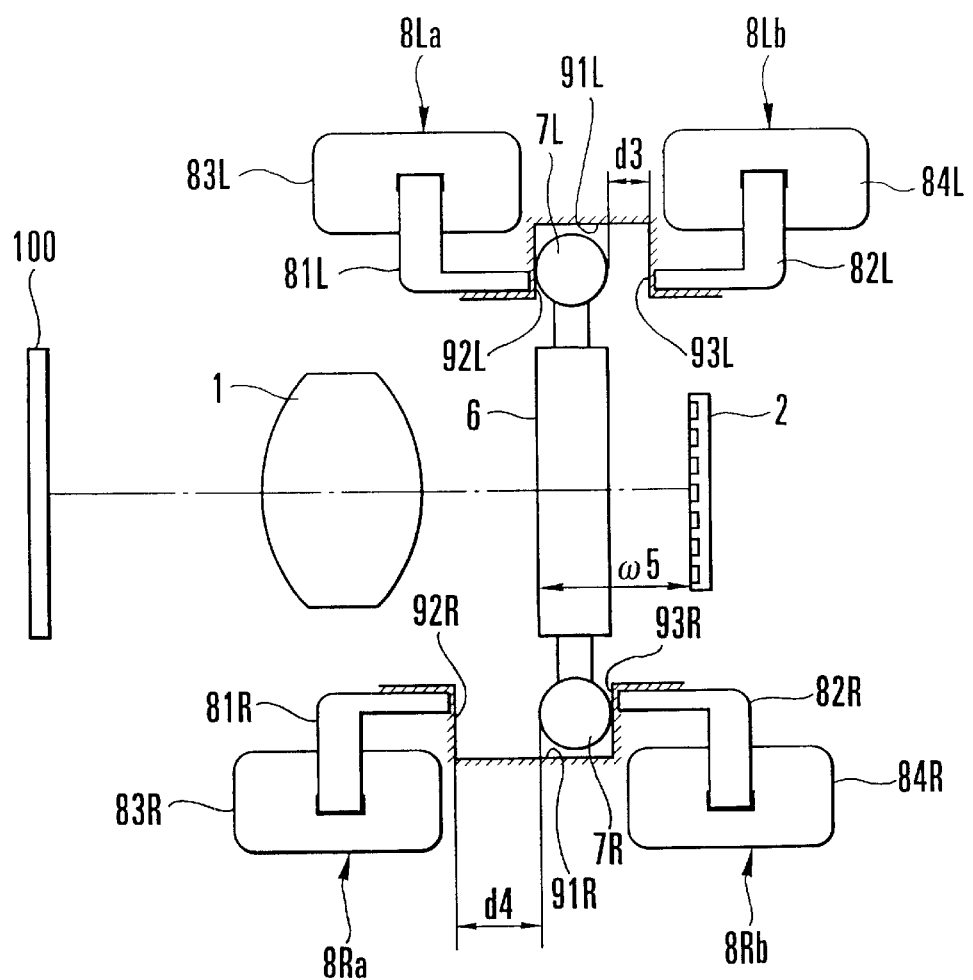
FIG. 8 is a diagrammatic view aiding in explaining the horizontal pixel shifting operation of the pixel shifting system according to the first embodiment of the present invention.
Figure 9:
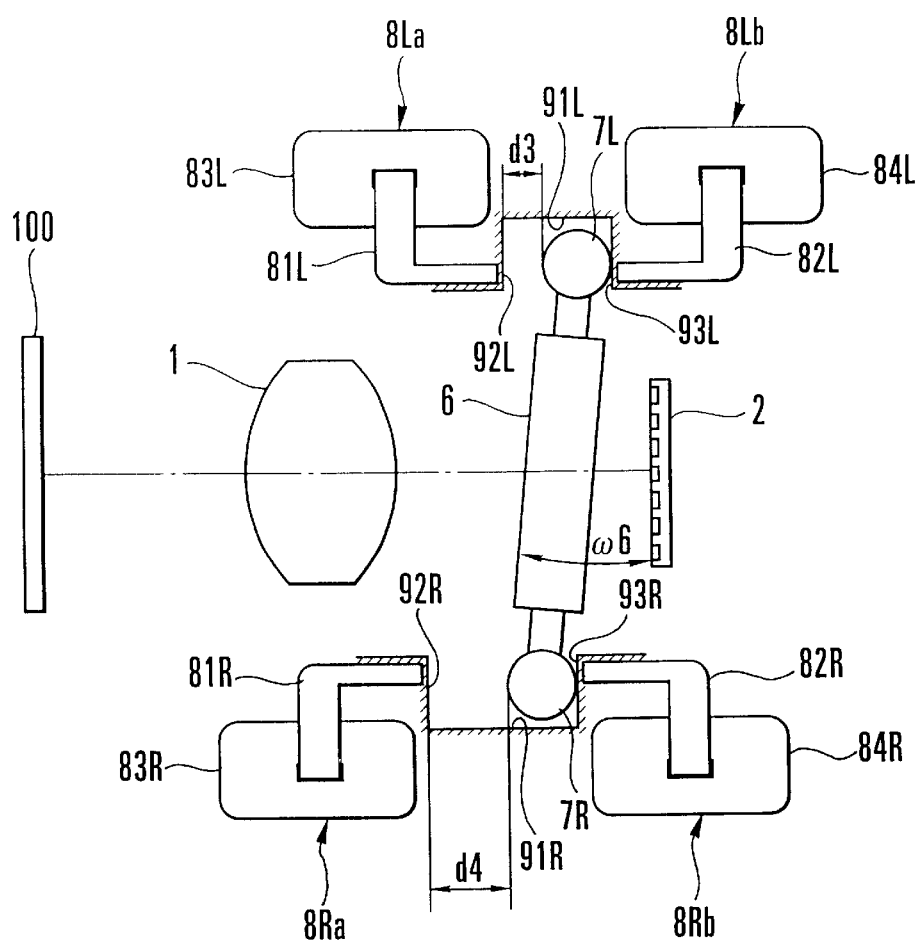
FIG. 9 is a diagrammatic view aiding in explaining the horizontal pixel shifting operation of the pixel shifting system according to the first embodiment of the present invention.
Figure 10:
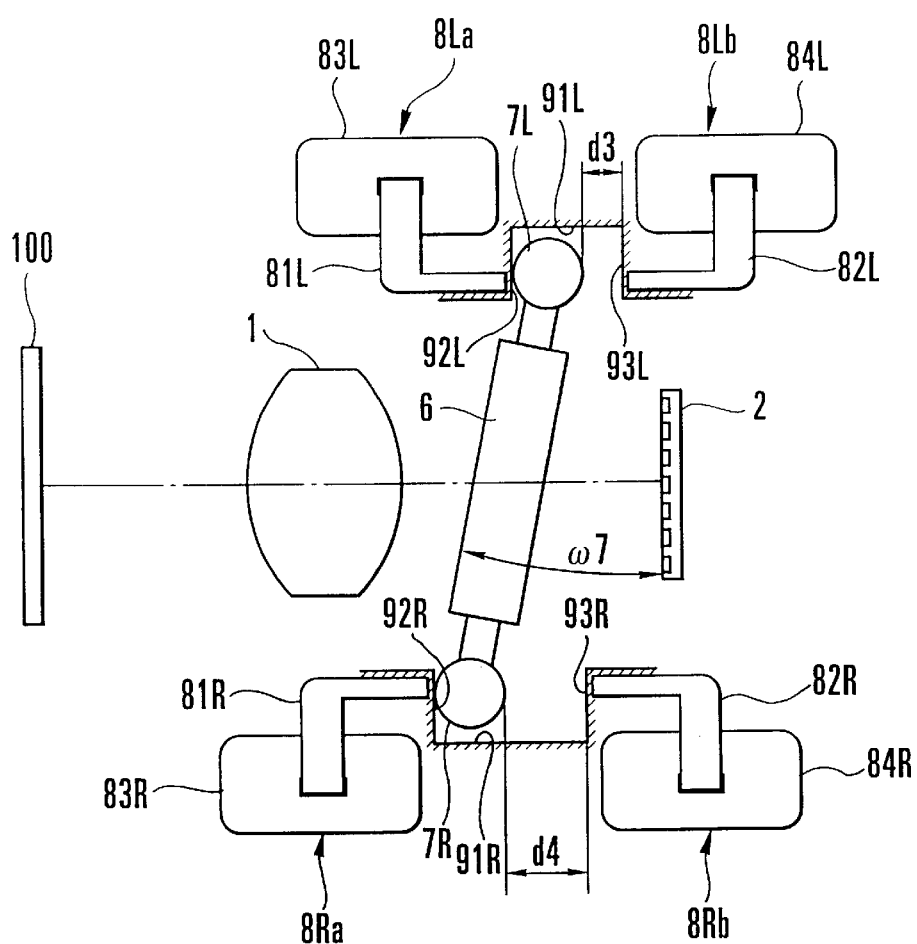
FIG. 10 is a diagrammatic view aiding in explaining the horizontal pixel shifting operation of the pixel shifting system according to the first embodiment of the present invention.
Figure 11:
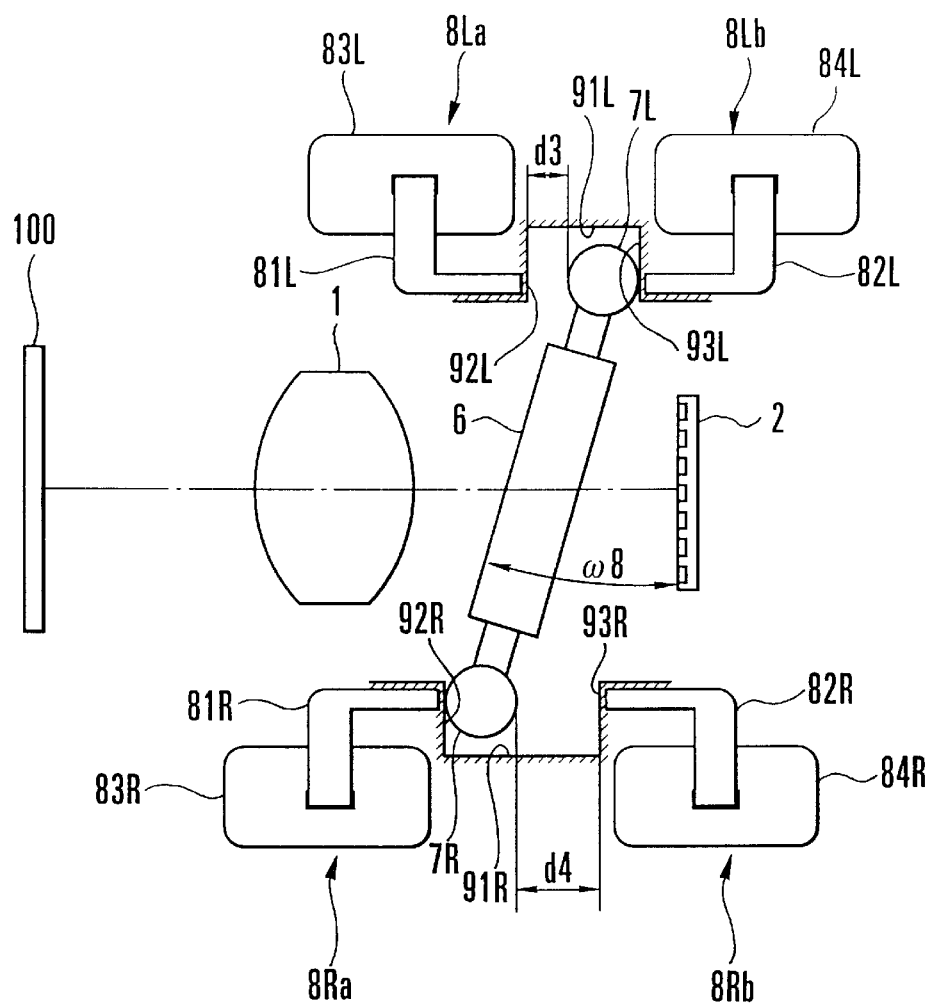
FIG. 11 is a diagrammatic view aiding in explaining the horizontal pixel shifting operation of the pixel shifting system according to the first embodiment of the present invention.

In the state shown in FIG. 7, the parallel-plane plate 3 is further inclined from the state of FIG. 6 toward the right as viewed in FIG. 6, and the inclination angle of the parallel-plane plate 3 reaches its maximum. Incidentally, ω4 denotes the angle made by the image pickup surface and the parallel-plane plate 3 in the state shown in FIG. 7.

As is apparent from FIGS. 4 to 7, by sequentially varying the inclination of the parallel-plane plate 3 in the order of ω1, ω2, ω3 and ω4, it is possible to control the parallel-plane plate 3 to vary its inclination angle in four steps. Thus, the incident position of the light beam coming from the subject can be vertically shifted among four positions on the image pickup surface.

Incidentally, the angles ω1 to ω4 are selected to satisfy the following relation:

$$(\omega 2 - \omega 1) = (\omega 3 - \omega 2) = (\omega 4 - \omega 3) = \text{constant},$$

and this relation indicates that the incident position of the light beam on the image pickup surface is shifted by an equal distance on the image pickup surface according to the variation in the inclination of the parallel-plane plate 3.

In the first embodiment, the clearance d1 between the permanent magnet 4U and the position restricting surface 92U or 93U in the recess 91U and the clearance d2 between the permanent magnet 4D and the position restricting surface 92D or 93D in the recess 91D are set so that the amount of shifting for one step becomes equal to half of the pixel-to-pixel distance of the image pickup element 2. The clearances d1 and d2, which determine the inclination angle of the parallel-plane plate 3, are varied according to the pixel-to-pixel distance of the image pickup element 2 or the amount of shifting for one step.

As is apparent from the above description, the parallel-plane plate 3 is supported with some play in such a manner that the opposite permanent magnets 4U and 4D are movably fitted in the respective recesses 91U and 91D, and the inclination angle of the parallel-plane plate 3 is determined by bringing each of the permanent magnets 4U and 4D into abutment with either of the position restricting surfaces in the corresponding one of the recesses 91U and 91D by the magnetic polarity of the associated one of the electromagnets due to excitation. Since each of the permanent magnets which comes into abutment with either of the corresponding position restricting surfaces has a cylindrical shape, even if the positions of abutment of the cylindrical permanent magnets on the position restricting surfaces integrally deviate in a longitudinal direction of the parallel-plane plate 3, the inclination angle of the parallel-plane plate 3 does not vary, so that the incident position of the light beam on the image pickup surface of the image pickup element does not vary.

Furthermore, even if the inclination angle of the parallel-plane plate 3 varies, the central position of the parallel-plane plate 3 in the direction of the optical axis does not vary, so that accurate pixel shifting can be effected at all times.

Incidentally, since each of the permanent magnets has a cylindrical shape, when the permanent magnet is attracted by the electromagnetic force of the corresponding electromagnet, the portion of the permanent magnet which comes into closest proximity to either of the corresponding position restricting surfaces forms a point (actually, a line). Therefore, the parallel-plane plate 3 is centered by the position of the yoke of the electromagnet, and substantially does not suffer a positional deviation.

Accordingly, the inclination of the parallel-plane plate 3 is set so that the incident position of the light beam on the image pickup surface is shifted with a distance equivalent to half of the pixel-to-pixel distance of the image pickup surface for each inclination angle, i.e., at a half-pixel pitch for each inclination angle. Accordingly, it is possible to obtain the number of pixels which is substantially four times the number of pixels of an actual image pickup element in the vertical direction thereof.

Thus, four images are picked up by the image pickup element for the respective inclination positions of the parallel-plane plate 3, and the picked-up four images are sequentially stored in a memory. During reading from the memory, the order of reading of each pixel of the four images is controlled so that the four images can be combined into one image of high image quality.

The above description has referred to the vertical pixel shifting on the image pickup surface. However, since the first embodiment of the present invention is also provided with a similar pixel shifting mechanism which performs horizontal pixel shifting, the first embodiment is capable of performing horizontal pixel shifting so that the number of pixels of the image pickup element can be made substantially four times, i.e., sixteen times in total.

FIGS. 8 to 11 are views aiding in explaining the operation of performing horizontal pixel shifting by sequentially varying the inclination angle of the parallel-plane plate 6 for horizontal pixel shifting.

Since the arrangement and the operation principle of the horizontal pixel shifting mechanism are the same as those of the vertical pixel shifting mechanism shown in FIGS. 4 to 7, the detailed description of the horizontal pixel shifting mechanism is omitted herein.

Incidentally, the inclination angle of the parallel-plane plate 6 is determined by position restricting surfaces 92L and 93L of a left recess 91L in which the permanent magnet 7L mounted at the left end of the parallel-plane plate 6 is movably fitted and position restricting surfaces 92R and 93R of a right recess 91R in which the permanent magnet 7R mounted at the right end of the parallel-plane plate 6 is movably fitted. Letting d3 be the clearance between the permanent magnet 7L and the width of the recess 91L, and letting d4 be the clearance between the permanent magnet 7R and the width of the recess 91R, the relation between d3 and d4 is set to d4=2d3 in the first embodiment.

In the above-described arrangement, if the angle made by the image pickup surface and the parallel-plane plate 6 is stepwise varied (increased) in the order of $\omega 5$, $\omega 6$, $\omega 7$ and $\omega 8$ while the inclination angle of the parallel-plane plate 6 is being increased in the order of FIGS. 8, 9, 10 and 11, horizontal pixel shifting can also be performed on the image pickup surface at intervals of an equal distance.

Incidentally, the angles $\omega 5$ to $\omega 8$ are selected to satisfy the following relation:

$(\omega 6 - \omega 5) = (\omega 7 - \omega 6) = (\omega 8 - \omega 7) =$ constant.

In the first embodiment, the clearance d3 between the permanent magnet 7L and the position restricting surface 92L or 93L in the recess 91L and the clearance d4 between the permanent magnet 7R and the position restricting surface 92R or 93R in the recess 91R are set so that the amount of shifting for one step becomes equal to half of the horizontal pixel-to-pixel distance of the image pickup element 2. The clearances d3 and d4, which determine the inclination angle of the parallel-plane plate 6, are varied according to the pixel-to-pixel distance of the image pickup element 2 or the amount of shifting for one step.

Incidentally, although the vertical pixel shifting shown in FIGS. 4 to 7 and the horizontal pixel shifting shown in FIGS. 8 to 11 are performed so as to sequentially increase the respective inclination angles of the parallel-plane plates 3 and 6, images are picked up for the respective inclination positions and stored in the memory so that the images can be combined into one image by processing to be performed at a later time. Accordingly, the respective inclination angles of the parallel-plane plates 3 and 6 may be varied in arbitrary order. In other words, the vertical pixel shifting and the horizontal pixel shifting need not be limited to the order shown in FIGS. 4 to 7 and the order shown in FIGS. 8 to 11, and may be performed in arbitrary order as long as four images in the vertical direction and four images in the horizontal image, a total of sixteen images, can be picked up by controlling each of the electromagnets.

Furthermore, since the vertical pixel shifting mechanism and the horizontal pixel shifting mechanism are independent of each other, the direction and the order of pixel shifting by each of the vertical and horizontal pixel shifting mechanisms may be arbitrary. As a matter of course, each of the parallel plates must be kept stationary during an image pickup operation for each pixel shifting position.

FIG. 12 is a diagrammatic view showing, on a pixel scale, variations in the incident position of a light beam on the image pickup surface which respective correspond to the four states of the parallel-plane plate 3 shown in FIGS. 4 to 7.

In FIG. 12, the respective states shown in FIGS. 4 to 7 are conceptually shown in Parts (1), (2), (3) and (4). As shown, by sequentially varying the inclination of the parallel-plane plate 3, the incident position of a light beam which would originally be made incident on only one point on the image pickup surface can be shifted among four locations, whereby four light beams for four vertically offset locations some of which lie between vertically adjacent pixels can be made incident on one pixel on the image pickup surface of the image pickup element.

In other words, it is possible to obtain image information carried by a light beam which would originally be incident on the non-photosensitive portion between each pixel on the image pickup surface or on a pixel other than a predetermined pixel. In consequence, it is possible to achieve an effect equivalent to an increase in the number of pixels per image pickup element.

In FIG. 12, reference numeral 2a denotes the image pickup surface of the image pickup element 2. A color filter is disposed on the image pickup surface 2a in such a manner that four kinds of pixels, Cy (cyan), Ye (yellow), G (green) and Mg (magenta), are arrayed as shown and constitute one pixel of a color image to be picked up.

During vertical pixel shifting, by varying the inclination angle of the parallel-plane plate 3 with respect to the optical axis thereof, it is possible to sequentially shift a light beam which would originally be made incident on the same position, among four vertical positions some of which are positions between adjacent pixels, i.e., positions where pixels are absent, as viewed in FIG. 12. In other words, as viewed from the side of the pixels of the image pickup element 2, it is possible to obtain image information for each pixel, which originally could not be obtained because the image information is carried by a light beam to be made incident on a position between each pixel and an adjacent pixel.

In the first embodiment, since pixel shifting is performed over four positions in the vertical direction and over four positions in the horizontal direction, it is possible to simply increase the number of pixels per image pickup element to substantially sixteen times (=4×4). If a pixel shifting system which performs pixel shifting in either one of the vertical and horizontal directions in accordance with the present invention is applied to an image pickup element having 1,300,000 pixels, it is possible to obtain an image quality equivalent to that obtainable with an image pickup element having 1,300,000×4=5,200,000 pixels.

Accordingly, if a pixel shifting system which performs pixel shifting in both the vertical and horizontal directions in accordance with the present invention is applied to such image pickup element having 1,300,000 pixels, it is possible to obtain an image quality equivalent to 5,200,000×4=20,800,000 pixels.

(Second Embodiment)

A second embodiment of the pixel shifting system according to the present invention will be described below.

As compared with the first embodiment, the feature of the second embodiment resides in a simplified driving system which includes electromagnets for driving parallel-plane plates, and its reduced power consumption.

Figure 13A:
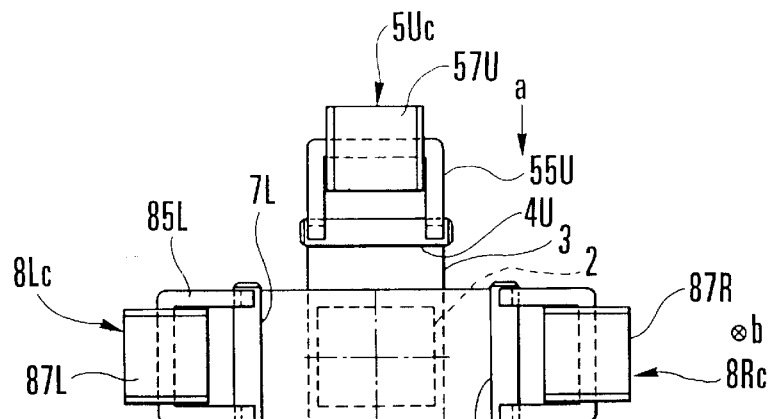
FIGS. 13(a), 13(b) and 13(c) are diagrammatic views showing the arrangement of a second embodiment of the present invention.
Figure 13C:
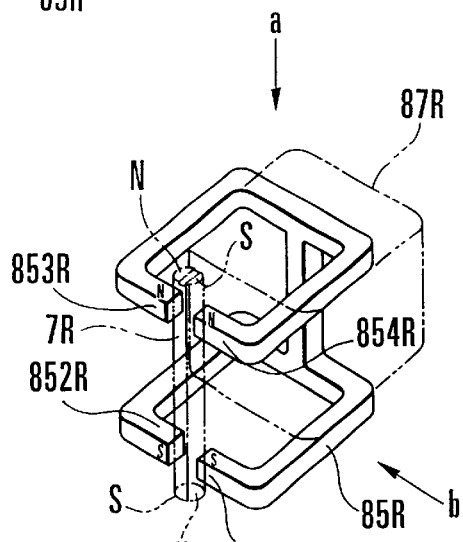
Figure 13B:
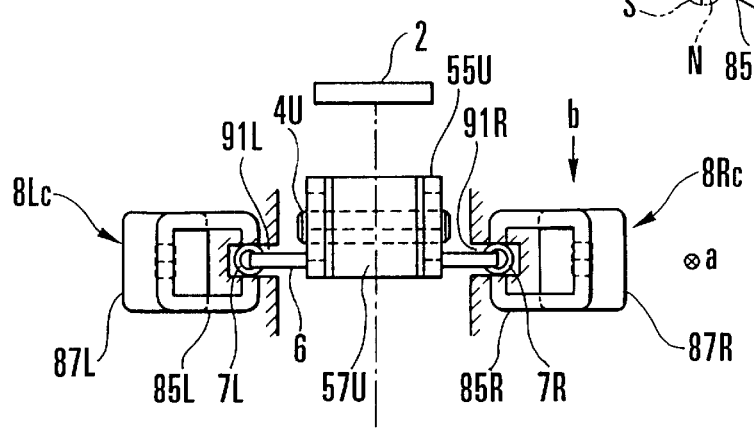

FIGS. 13(*a*), 13(*b*) and 13(*c*) show the essential portion of the second embodiment. FIG. 13(*a*) is a front elevational view taken in the direction of the optical axis, and FIG. 13(b) is a top plan view.

As shown in each of FIGS. 13(a), 13(b) and 13(c), the second embodiment differs from the first embodiment in that part of the coils of the electromagnets used in the first embodiment are omitted and each pair of opposed ones of the electromagnets is integrated into one electromagnet. In FIGS. 13(a) and 13(b), identical reference numerals are used to denote constituent elements identical to those used in the first embodiment, and the description of such constituent elements is omitted for the sake of simplicity.

Specifically, in the respective electromagnets of the second embodiment, the coils 53U and 54U are replaced with one coil 57U, the coils 53D and 54D with one coil 57D, the coils 83L and 84L with one coil 87L, and the coils 83R and 84R with one coil 87R. Further, the yokes 51U and 52U are replaced with one yoke 55U, the yokes 51D and 52D with one yoke 55D, the yokes 81L and 82L with one yoke 85L, and the yokes 81R and 82R with one yoke 85R.

The reasons why the integration of the yokes 51U and 52U; 51D and 52D; 81L and 82L; and 81R and 82R can be realized are that the yokes 51U and 52U; 51D and 52D; 81L and 82L; and 81R and 82R are arranged to be magnetized so that magnetic poles to appear at both ends of either of the paired yokes become the same as magnetic poles to appear at their opposite ends of the other, and that each of the permanent magnets has alternate magnetization patterns. Thus, in the second embodiment, it is possible to reduce the required number of electromagnets to four which is half the number (8) of electromagnets required in the first embodiment.

FIG. 13(c) shows the shape of the yoke 85R. An arrow "a" is headed in the direction from the top to the bottom of the yoke 85R as viewed in FIG. 13(a), and an arrow "b" is headed in the direction from the obverse surface to the reverse surface of the sheet of FIG. 13(a).

It is assumed here that the permanent magnet 7R, which is made from a cylindrical member and located to extend through the gaps of the yokes 85R and 85L, is magnetized so that, as viewed in FIG. 13(c), the lengthwise left-side portion of the permanent magnet 7R has the N pole and the S pole at its top and bottom ends, respectively, while the lengthwise right-side portion of the permanent magnet 7R has the S pole and the N pole at its top and bottom ends, respectively. In this state of magnetization, if the coil 87R is energized so that end portions 851R and 852R of the yoke 85R are magnetized to have the S poles, while end portions 853R and 854R of the yoke 85R are magnetized to have the N poles, the top portion of the permanent magnet 7R is moved toward the end portion 854R by an attractive force which acts between the right-side portion of the top portion of the permanent magnet 7R and the end portion 854R of the yoke 85R, and a repulsive force which acts between the left portion of the top portion of the permanent magnet 7R and the end portion 853R of the yoke 85R.

Similarly, the bottom portion of the permanent magnet 7R is moved toward the end portion 851R by an attractive force which acts between the right-side portion of the bottom portion of the permanent magnet 7R and the end portion 851R of the yoke 85R, and a repulsive force which acts between the left portion of the bottom portion of the permanent magnet 7R and the end portion 852R of the yoke 85R.

Accordingly, in the second embodiment which has one coil per permanent magnet, an attractive force and a repulsive force are concurrently applied to the permanent magnet at all times in a manner similar to that performed in the first embodiment, and the permanent magnet 7R can be driven with a force twice as large as the force with which a mere armature is attracted by electromagnets.

Since the vertical pixel shifting operation of the parallel-plane plate 3 and the horizontal pixel shifting operation of the parallel-plane plate 6 are as described previously with reference to FIGS. 4 to 7, 8 to 11 in connection with the first embodiment, a further description is omitted herein.

The arrangement and the operation of the pixel shifting system according to the present invention are as described above, and the following description will refer to an arrangement in which such a pixel shifting system is actually incorporated in a lens barrel or a camera body.

Figure 14:
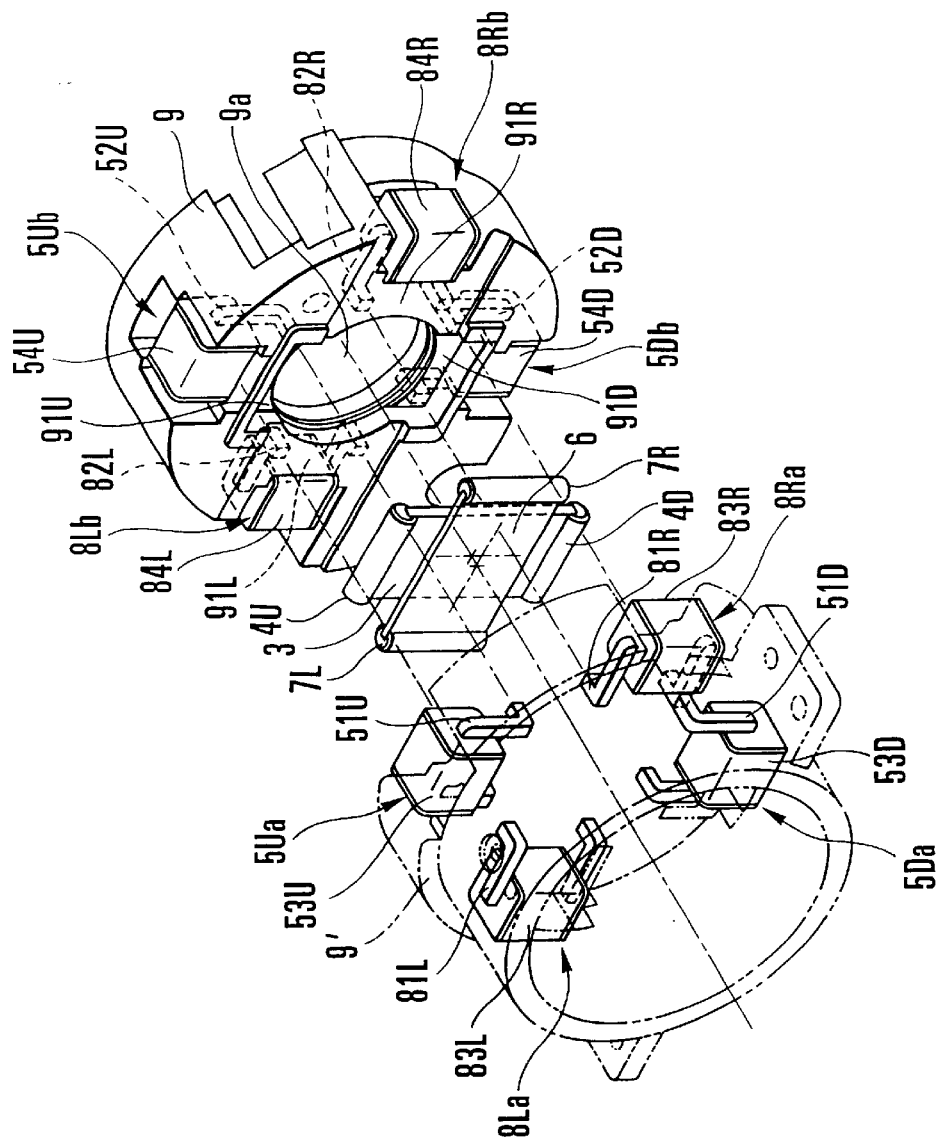
FIG. 14 is an exploded perspective view showing an arrangement in which a pixel shifting system according to any of the embodiments of the present invention is incorporated as a unit.

FIG. 14 is an exploded perspective view of a pixel shifting unit in which the pixel shifting mechanism according to the first or second embodiment of the present invention is incorporated.

In FIG. 14, reference numerals 9 and 9' denote frames each of which supports the corresponding electromagnets and parallel-plane plates. The frames 9 and 9' are separated from each other in the direction of the optical axis, and each of them has an opening through which to pass a light beam at a location centered about the optical axis.

The electromagnets 5Ub, 5Db, 8Lb and 8Rb are disposed at predetermined positions of the joining surface of the rear frame 9 which surrounds the opening 9a of the rear frame 9 and is opposed to the front frame portion 9'. The position restricting surfaces 93U and 93D; 93L and 93R are respectively formed in the recesses 91U and 91D; 91L and 91R into which to insert the vertical and horizontal parallel-plane plates 3 and 6, respectively.

The respective yokes 52U and 52D of the electromagnets 5Ub and 5Db are exposed at positions opposed to the permanent magnets 4U and 4D of the parallel-plane plate 3, while the respective yokes 82L and 82R of the respective electromagnets 8Lb and 8Rb are exposed at positions opposed to the permanent magnets 7L and 7R of the parallel-plane plate 6.

The front frame 9' which is opposed to the rear frame 9 has the electromagnets 5Ua, 5Da, 8La and 8Ra at positions opposed to the respective electromagnets 5Ub, 5Db, 8Lb and 8Rb. The position restricting surfaces 92U, 92D, 92L and 92R are respectively formed in the recesses 91U, 91D, 91L and 91R.

Accordingly, by connecting the front frame 9' and the rear frame 9, the vertical and horizontal parallel-plane plates 3 and 6 and the electromagnets for controlling the positions of the parallel-plane plates 3 and 6 can be supported as shown in FIGS. 1(a) and 1(b) to 11.

Figure 15:
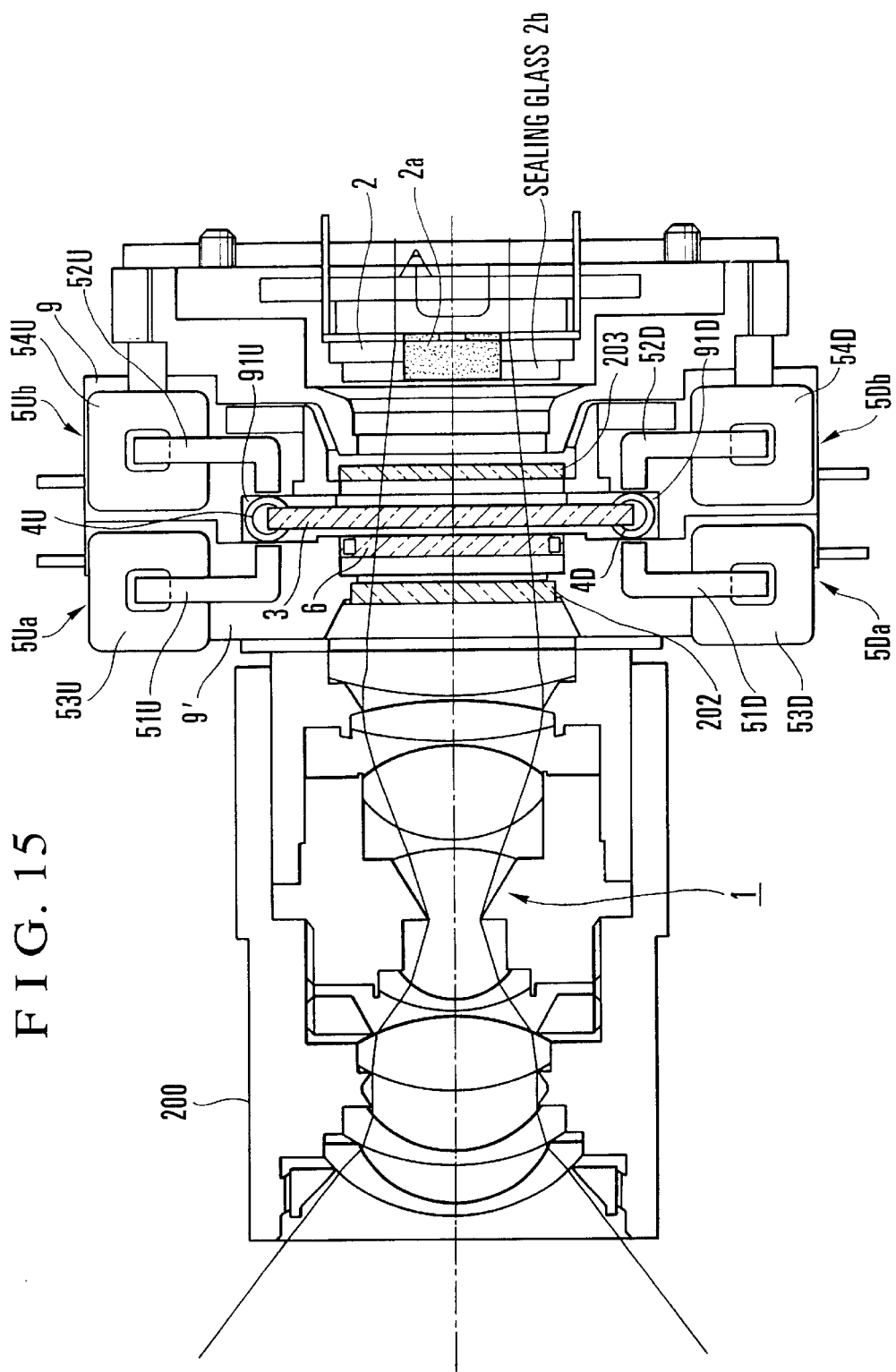
FIG. 15 is a diagrammatic cross-sectional view showing an arrangement in which the unit of a pixel shifting mechanism according to any of the embodiments of the present invention is actually incorporated into a camera body.

FIG. 15 is a cross-sectional side view showing an arrangement in which the aforesaid pixel shifting unit is incorporated in a camera body.

As shown in FIG. 15, an image pickup lens unit 1 is disposed in a lens barrel 200, and the pixel shifting unit shown in FIG. 14 is disposed on the mount portion of the lens barrel 200. The pixel shifting unit is composed of the front frame 9' and the rear frame 9. As shown in FIG. 15, the LPF (optical low-pass filter) 202 for limiting the spatial frequency of an incident light beam, the parallel-plane plate 6 for horizontal pixel shifting, the parallel-plane plate 3 for vertical pixel shifting and the LPF (optical low-pass filter) 203 are disposed in that order in the pixel shifting unit, and the image pickup element 2 is disposed behind the pixel shifting unit. In FIG. 15, reference numeral 2a denotes an effective image pickup surface (image pickup area) of the image pickup element 2, and reference numeral 2b denotes a sealing glass for the image pickup surface of the image pickup element 2.

An infrared cut-filter may be disposed, as by coating a surface of the parallel-plane plate 3 or 6.

The LPFs 202 and 203 cooperate in band-limiting the spatial frequency of an incident light beam, thereby eliminating moiré or the like due to a fold-back effect. The LPF 202 is rotatably disposed so that the effect of the LPFs 202 and 203 can be cancelled by rotating the wavelength of the incident light beam according to the rotation of the LPF 202.

Accordingly, if it is necessary to remove the band-limiting effect of the LPFs 202 and 203 in order to pick up an image of particularly high quality, the LPF 202 needs only to be rotated without being removed from the camera body. This art is described in detail in Japanese Laid-Open Patent Application No. Hei 7-245762, and the description thereof is omitted herein.

A circuit for driving the aforesaid pixel shifting mechanism will be described below with reference to FIG. 16.

Figure 16:
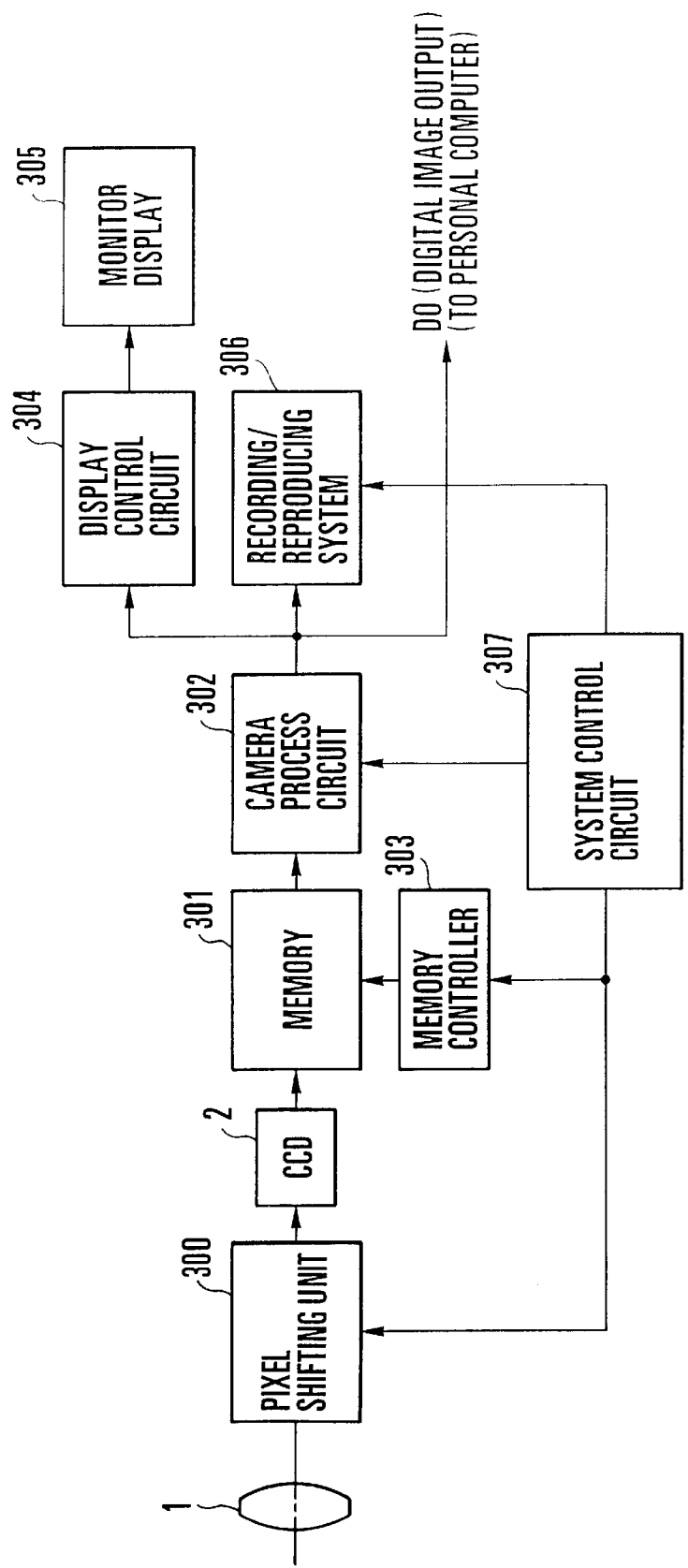
FIG. 16 is a block diagram showing a circuit arrangement for picking up an image by using the pixel shifting system according to any of the embodiments of the present invention.

Referring to FIG. 16, a pixel shifting unit 300 is disposed in the space between the image pickup lens unit 1 and the image pickup element 2.

A picked-up image signal outputted from the image pickup element 2 is stored in a memory 301. The image data read from the memory 301 is supplied to a camera process circuit 302, and the camera process circuit 302 produces a luminance signal and a chrominance signal. The luminance signal and the chrominance signal are supplied to a recording/reproducing system 306 and recorded on a recording medium which is not shown.

The luminance signal and the chrominance signal are also supplied to a display control circuit 304. The display control circuit 304 converts both signals into a signal format suited to display on a monitor, and the obtained signal is visually displayed on a monitor display 305.

In addition, the output signal of the camera process circuit 302 may be directly outputted to an external apparatus such as a personal computer through a digital image output terminal DO in the form of a digital image signal.

The image processing circuit having the above-described arrangement is controlled by a system control circuit 307 composed of a microcomputer.

In other words, the pixel shifting unit 300 is controlled to sequentially control the respective parallel-plane plates in the vertical and horizontal directions, thereby performing pixel shifting.

In the second embodiment of the present invention, for example, the system control circuit 307 controls the parallel-plane plate 3 to perform vertical pixel shifting of four steps and in each of the four steps, controls the parallel-plane plate 6 to perform horizontal pixel shifting of four steps. Accordingly, it is possible to obtain four images in the vertical direction and four images in the horizontal direction, a total of sixteen images.

Each of these images is sequentially stored in the memory 301 which is being controlled by a memory controller 303. After all the images have been stored in the memory 301, the images are read from the memory 301 to combine the images into one image, while sequentially controlling the reading from the memory 301 on a pixel-by-pixel basis. The obtained image signal is supplied to the camera process circuit 302, in which it is subjected to luminance signal processing and chrominance signal processing so that an image signal of high image quality can be obtained.

Incidentally, the signal read from the memory 301 may be outputted to an external apparatus such as a personal computer without performing the above-described camera process, and the required kinds of image processing may be performed on the side of the external apparatus.

With the above-described processing, it is possible to pick up an image of high image quality which is equivalent to the image quality of an image picked up by an image pickup element, the number of pixels of which is far greater than the actual number of pixels of the image pickup element.

As described above, in the pixel shifting system according to each of the embodiments of the present invention, not motors but electromagnetic driving means such as electromagnets are used as a driving source in the pixel shifting system, while not mechanisms such as complicated cams but abutment spaces are used as position controlling means in the pixel shifting system, and the abutment spaces for position control have different sizes so that the respective inclination positions of pixel shifting optical elements such as parallel-plane plates are individually controlled. Accordingly, the number of members which need to have high dimensional accuracy can be minimized, and particular support shafts for controlling the inclination positions of the optical elements can be eliminated, so that it is possible to realize a pixel shifting system which is capable of obtaining a plurality of stable optical positions by means of a simple mechanism which can operate at a far higher speed by a far simpler control method.

As is apparent from the foregoing description, in each of the embodiments of the present invention, a plurality of restricting portions for restricting the inclination position of an optical element in the direction of the optical axis are formed at the opposite ends of the optical element for shifting the incident position of a light beam on an image pickup surface, and the inclination position of the optical element is controlled by bringing the optical element into selective abutment with the restricting portions. Accordingly, a pixel shifting operation can be performed with an extremely high positioning accuracy by a simple mechanism.

Furthermore, since an electromagnetic circuit including electromagnetic driving means and permanent magnets is used as driving means, a complicated driving mechanism is not needed. By using such driving means in combination with the arrangement for simply bringing the optical element into selective abutment with the restricting surfaces by electromagnetic force, it is possible to realize extremely high-speed driving.

With the above-described arrangement, since it is unnecessary to use complicated mechanisms which would have been incorporated in a conventional arrangement, such as a mechanism for supporting the optical element and a mechanism such as a cam for controlling the inclination position of the optical element, it is possible to achieve reductions in cost and mounting space.

The position restricting surfaces are formed before and behind each end portion of the optical element in the direction of the optical axis so that the combination of the position restricting surfaces which each end portion of the optical element selectively comes into abutment with can be modified to control the optical element to cause it to move among a plurality of inclination angles. Accordingly, the inclination angle of the optical element can be controlled among a plurality of angles merely by modifying the combination of the position restricting surfaces which each end portion of the optical element selectively comes into abutment with, whereby it is possible to realize high-speed and high-precision pixel shifting by means of an extremely simple arrangement.

Furthermore, the ranges of movements of the respective end portions of the optical element in the direction of the optical axis, which movements are allowed by the position restricting surfaces, are selected so that the ratio of the range of movement of one of the end portions to the range of movement of another of the end portions is made 1:2, whereby the inclination angle of the optical element can be divided into four equal angles and controlled in four steps and pixel shifting of high image quality can be performed by means of a simple arrangement.

Furthermore, since each engaging part of the optical element is brought in point or line contact with either of the corresponding restricting surfaces during selective abutment therewith, even if a variation occurs in the position of engagement of the engaging part of the optical element (parallel-plane plate) with either of the corresponding restricting surfaces and a positional deviation of the engaging part occurs in a plane parallel to the image pickup surface, the angle of inclination of the optical element can be kept constant and such positional deviation can be prevented from affecting the amount of pixel shifting.

Furthermore, since a cylindrical member for line contact (or a plurality of point contact members) or the like is employed, it is possible to realize high-precision positioning without causing a lengthwise inclination of the cylindrical member with respect to the restricting surfaces.

Furthermore, the electromagnetic driving means are composed of a plurality of electromagnets which are provided for the respective restricting surfaces, and the optical elements are driven by electromagnetic forces acting between the permanent magnets of the optical elements and the electromagnets, whereby it is possible to vary the inclination position of each of the optical members at an extremely high speed by means of a simple arrangement which only controls the energization and deenergization of the electromagnets.

Furthermore, the optical elements include a vertical optical element for vertically shifting the incident position of a light beam on the image pickup surface and a horizontal optical element for horizontally shifting the incident position of a light beam on the image pickup surface, so that it is possible to realize pixel shifting in both vertical and horizontal directions, i.e., a further improvement in image quality.

Otherwise, it is possible to realize a pixel shifting unit in which a plurality of restricting portions for restricting the inclination position of an optical element in the direction of the optical axis are formed at the opposite ends of the optical element for shifting the incident position of a light beam on an image pickup surface, and the inclination position of the optical element is controlled by bringing the optical element into selective abutment with the restricting portions. Such pixel shifting unit can perform a pixel shifting operation with an extremely high positioning accuracy by means of a simple mechanism.

Furthermore, in the pixel shifting unit, since an electromagnetic circuit including electromagnetic driving means and permanent magnets is used as driving means, a complicated driving mechanism is not needed. By using such driving means in combination with the arrangement for simply bringing the optical element into selective abutment with the restricting surfaces by electromagnetic force, it is possible to realize extremely high-speed driving.

With the above-described arrangement, since it is unnecessary to use complicated mechanisms which would have been incorporated in a conventional arrangement, such as a mechanism for supporting the optical element and a mechanism such as a cam for controlling the inclination position of the optical element, it is possible to achieve reductions in cost and mounting space.

The position restricting surfaces are formed before and behind each end portion of the optical element in the direction of the optical axis so that the combination of the position restricting surfaces which each end portion of the optical element selectively comes into abutment with can be modified to control the optical element to cause it to move among a plurality of inclination angles. Accordingly, the inclination angle of the optical element can be controlled among a plurality of angles merely by modifying the combination of the position restricting surfaces which each end portion of the optical element selectively comes into abutment with, whereby it is possible to realize high-speed and high-precision pixel shifting by means of an extremely simple arrangement.

Furthermore, since each engaging part of the optical element is brought in point or line contact with either of the corresponding restricting surfaces during selective abutment therewith, even if a variation occurs in the position of engagement of the engaging part of the optical element (parallel-plane plate) with either of the corresponding restricting surfaces and a positional deviation of the engaging part occurs in a plane parallel to the image pickup surface, the angle of inclination of the optical element can be kept constant and such positional deviation can be prevented from affecting the amount of pixel shifting.

Furthermore, since a cylindrical member for line contact (or a plurality of point contact members) or the like is employed, it is possible to realize high-precision positioning without causing a lengthwise inclination of the cylindrical member with respect to the restricting surfaces.

Furthermore, the electromagnetic driving means are composed of a plurality of electromagnets which are provided for the respective restricting surfaces, and the optical elements are driven by electromagnetic forces acting between the permanent magnets of the optical elements and the electromagnets, whereby it is possible to vary the inclination position of each of the optical members at an extremely high speed by means of a simple arrangement which only controls the energization and deenergization of the electromagnets.

Furthermore, the optical elements include a vertical optical element for vertically shifting the incident position of a light beam on the image pickup surface and a horizontal optical element for horizontally shifting the incident position of a light beam on the image pickup surface, so that it is possible to realize pixel shifting in both vertical and horizontal directions, i.e., a further improvement in image quality.

Furthermore, the optical element for shifting the incident position of an incident light beam is movably supported at its opposite ends in recess portions, and the inclination position of the optical element is controlled by bringing the opposite ends into selective abutment with a plurality of restricting portions formed in the recesses and restricting the ranges of movements of the optical element at the opposite ends in the direction of the optical axis. Accordingly, a high-speed and high-precision pixel shifting operation basically can be realized by a simple mechanism which only brings the optical element into selective abutment with the restricting portions.

In addition, in spite of a simple arrangement, it is possible to attain an extremely high positioning accuracy by selectively bringing the optical element directly into abutment with the restricting surfaces.

Since it is unnecessary to use complicated mechanisms which would have been incorporated in a conventional arrangement, such as a mechanism for supporting the optical element and a mechanism such as a cam for controlling the inclination position of the optical element, it is possible to achieve reductions in cost and mounting space.

Since there is no need for such a complicated mechanism and the optical element can be positioned by being selectively brought into direct abutment with the restricting surfaces, it is possible to attain an image pickup operation with an extremely high-speed pixel shifting.

Furthermore, since such an optical apparatus according to the present invention can be incorporated in a lens barrel or a camera body as an unit, it is possible to realize an image pickup apparatus having a simple and compact arrangement and a large degree of freedom of design.

What is claimed is:

1. An image pickup apparatus comprising:

image pickup device arranged to photoelectrically convert an optical image formed on an image pickup surface and output a picked-up image signal;

an optical element arranged to shift an incident position of incident light on the image pickup surface;

a plurality of restricting portions arranged to control an inclination position of said optical element with respect to an optical axis by engaging with said optical element; and driving device arranged to drive said optical element to engage said optical element with said plurality of restricting portions, wherein said driving device includes electromagnetic driving device, and permanent magnets are respectively disposed in portions of said optical element which are to be exposed to an action of electromagnetic force of said electromagnetic driving device, said optical element being driven by an electromagnetic circuit formed by the permanent magnets of said optical element and said electromagnetic driving device, and each of said plurality of restricting portions has a pair of position restricting surfaces formed before and behind a corresponding one of the end portions of said optical element in the direction of the optical axis, said optical element being capable of being controlled to move among a plurality of inclination angles, by changing a combination of the position restricting surfaces which the end portions of said optical element selectively come into abutment with, and the respective end portions of said optical element, each of which selectively comes into abutment with corresponding ones of the plurality of position restricting surfaces, have engaging parts each of which selectively comes into line or point contact with the corresponding ones of the plurality of position restricting surfaces.

2. An image pickup apparatus according to claim 1, wherein said optical element is a parallel-plane plate provided in an incident optical path extending to said image pickup device, and said plurality of restricting portions are arranged to shift the incident position of the incident light on the image pickup surface by respectively restricting positions of end portions of said optical element and controlling the inclination angle of the parallel-plane plate relative to the optical axis.

3. An image pickup apparatus according to claim 1, wherein ranges of movements of the respective end portions of said optical element in the direction of the optical axis, which movements are allowed by the plurality of position restricting surfaces, are selected so that a ratio of the range of movement of one of the end portions to the range of movement of another of the end portions is made 1:2 so as to equally divide an inclination angle of said optical element between a maximum inclination position and a minimum inclination position.

4. An image pickup apparatus according to claim 1, wherein each of the engaging parts is a cylindrical member which selectively comes into line contact with the corresponding ones of the plurality of position restricting surfaces.

5. An image pickup apparatus according to claim 1, wherein said electromagnetic driving device has a plurality of electromagnets respectively provided for the plurality of position restricting surfaces and forms an electromagnetic circuit in combination with the permanent magnets formed at the respective engaging parts of said optical element, said electromagnetic driving device being arranged to change the inclination position of said optical element by controlling a direction of current of each of the plurality of electromagnets and selecting position restricting surfaces to be bought into abutment with said optical element.

6. An image pickup apparatus according to claim 1, wherein said optical element includes a vertical optical element for shifting the incident position of the incident light on the image pickup surface, in a vertical direction on the image pickup surface, and a horizontal optical element for shifting the incident position of the incident light on the image pickup surface, in a horizontal direction on the image pickup surface.

7. An optical apparatus comprising:

an optical element arranged to shift an incident position of incident light on an image pickup surface;

a plurality of restricting portions arranged to control an inclination position of said optical element with respect to an optical axis by engaging with said optical element; and driving device arranged to drive said optical element to engage said optical element with said plurality of restricting portions, wherein said driving device includes electromagnetic driving device, and permanent magnets are respectively disposed in portions of said optical element which are to be exposed to an action of electromagnetic force of said electromagnetic driving device, said optical element being driven by an electromagnetic circuit formed by the permanent magnets of said optical element and said electromagnetic driving device, and the respective end portions of said optical element, each of which selectively comes into abutment with corresponding ones of the plurality of position restricting surfaces, have engaging parts each of which selectively comes into line or point contact with the corresponding ones of the plurality of position restricting surfaces.

8. An optical apparatus according to claim 7, wherein said optical element is a parallel-plane plate provided in an incident optical path extending to the image pickup surface, and each of said plurality of restricting portions has a pair of position restricting surfaces formed before and behind a corresponding one of the end portions of said optical element in the direction of the optical axis, said optical element being capable of being controlled to move among a plurality of inclination angles, by changing a combination of the position restricting surfaces which the end portions of said optical element selectively come into abutment with.

9. An optical apparatus according to claim 8, wherein said electromagnetic driving device has a plurality of electromagnets respectively provided for the plurality of position restricting surfaces and forms an electromagnetic circuit in combination with the permanent magnets formed at the respective engaging parts of said optical element, said electromagnetic driving device being arranged to change the inclination position of said optical element by controlling a direction of current of each of the plurality of electromagnets and selecting position restricting surfaces to be brought into abutment with said optical element.

10. An optical apparatus according to claim 8, wherein said optical element includes a vertical optical element for shifting the incident position of the incident light on the image pickup surface, in a vertical direction on the image pickup surface, and a horizontal optical element for shifting the incident position of the incident light on the image pickup surface, in a horizontal direction on the image pickup surface.

11. An optical apparatus according to claim 8, wherein said plurality of restricting portions respectively include recess portions which support said optical element within a predetermined moving range at least in the direction of the optical axis with the end portions of said optical element being respectively movably fitted in said recess portions, and the pair of position restricting surfaces are respectively formed on surfaces opposed to the respective end portions of said optical element in each of said recess portions, the pairs of position restricting surfaces in said respective recess portions being arranged to control said optical element to move said optical element among a plurality of inclination positions with respect to the optical axis, by respectively selectively coming into abutment with the end portions of said optical element and restricting moving ranges of the respective end portions in the direction of the optical axis.

12. An optical apparatus according to claim 7, wherein each of the engaging parts is a cylindrical member which selectively comes into line contact with the corresponding ones of the plurality of position restricting surfaces.

* * * * *

UNITED STATES PATENT AND TRADEMARK OFFICE
CERTIFICATE OF CORRECTION

PATENT NO. : 6,473,121 B1
DATED : October 29, 2002
INVENTOR(S) : Kiochi Shimada

It is certified that error appears in the above-identified patent and that said Letters Patent is hereby corrected as shown below:

Title page,
Item [74], delete "BLecker" and insert -- Blecker --.

Column 3,
Line 15, after "drawings." delete "dr".

Column 5,
Line 16, delete "62" and insert -- $\delta 2$ --.

Column 8,
Line 3, delete "40" and insert -- 4U --.

Column 11,
Line 31, delete "4 u" and insert -- 4U --.

Signed and Sealed this

Twenty-first Day of October, 2003

JAMES E. ROGAN
*Director of the United States Patent and Trademark Office*